(12) United States Patent
Burkhart et al.

(10) Patent No.: US 11,816,562 B2
(45) Date of Patent: Nov. 14, 2023

(54) DIGITAL EXPERIENCE ENHANCEMENT USING AN ENSEMBLE DEEP LEARNING MODEL

(71) Applicant: Adobe Inc., San Jose, CA (US)

(72) Inventors: Michael Craig Burkhart, San Jose, CA (US); Kourosh Modarresi, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 1076 days.

(21) Appl. No.: 16/375,627

(22) Filed: Apr. 4, 2019

(65) Prior Publication Data

US 2020/0320382 A1 Oct. 8, 2020

(51) Int. Cl.
*G06N 20/20* (2019.01)
*G06N 3/08* (2023.01)

(52) U.S. Cl.
CPC ............. *G06N 3/08* (2013.01); *G06N 20/20* (2019.01)

(58) Field of Classification Search
CPC ................................ G06N 3/08; G06N 20/20
See application file for complete search history.

(56) References Cited

U.S. PATENT DOCUMENTS

2020/0231466 A1* 7/2020 Lu ........................ G01N 33/18

OTHER PUBLICATIONS

Géron, Aurélien, Hands-On Machine Learning with Scikit-Learn and TensorFlow Chapter 7 Excerpt, 2017. (Year: 2017).*
Geron, Aurelien, Hands-On Machine Learning with Scikit-Learn & TensorFlow, 2017 (Year: 2017).*
Asmita et al., Review on the Architecture, Algorithm and Fusion Strategies in Ensemble Learning, International Journal of Computer Applications, vol. 108 No. 8, Dec. 2014. (Year: 2014).*
Deng et al., DeepCF: A Unified Framework of Representation Learning and Matching Function Learning in Recommender System, 33rd AAAI Conference on Artificial Intelligence, Jan. 2019. (Year: 2019).*
Tsikrika et al., A Hybrid Recommendation System Based on Density-Based Clustering, Mar. 2018. (Year: 2018).*
Yang et al., Neural Network Ensemble: Combining Multiple Models for Enhanced Performance Using a Multistage Approach, Expert Systems, vol. 21 No. 5, Nov. 2004. (Year: 2004).*
Wozniak et al., A Survey of Multiple Classifier Systems as Hybrid Systems, Information Fusion, vol. 16, 2014. (Year: 2014).*

(Continued)

*Primary Examiner* — Marshall L Werner
(74) *Attorney, Agent, or Firm* — FIG. 1 Patents

(57) ABSTRACT

A digital experience enhancement system includes an ensemble deep learning model that includes an estimator ensemble and a neural network. The ensemble deep learning model is trained to generate a digital experience enhancement recommendation from an enhancement request. The ensemble deep learning model receives the enhancement request, which is input to the estimator ensemble. The estimator ensemble uses various different machine learning systems to generate estimator output values. The neural network uses the estimator output values from the estimator ensemble to generate a digital experience enhancement recommendation. The digital experience generation system then uses this digital experience enhancement recommendation to enhance the digital experience.

20 Claims, 7 Drawing Sheets

(56) References Cited

OTHER PUBLICATIONS

Géron, Aurélien, Hands-On Machine Learning with Scikit-Learn and TensorFlow (Entire Book), 2017. (Year: 2017).*
Ghai et al., Multi-Level Ensemble Learning based Recommender System, 2018. (Year: 2018).*
Abadi,"TensorFlow: Large-Scale Machine Learning on Heterogeneous Distributed Systems", Mar. 16, 2016, 19 pages.
Akaike,"A New Look at the Statistical Model Identification", IEEE Transactions on Automatic Control, vol. AC-19, No. 6, Dec. 1974, pp. 716-723.
Baglama,"Augmented Implicitly Restarted Lanszos Bidiagonalization Methods", SIAM J. Sci. Comput. vol. 27, No. 1, Jan. 2005, pp. 19-42.
Behnel,"Cython: The best of both worlds", Aug. 8, 2014, 9 pages.
Bell,"Improved Neighborhood-based Collaborative Filtering", in International Conference on Knowledge Discovery and Data Mining, 2007., Aug. 12, 2007, 8 pages.
Bell,"Lessons from the Netflix Prize Challenge", Dec. 1, 2007, pp. 75-79.
Bell,"Modeling Relationships at Multiple Scales to Improve Accuracy of Large Recommender Systems", Aug. 15, 2007, 10 pages.
Bell,"Scalable Collaborative Filtering with Jointly Derived Neighborhood Interpolation Weights", Seventh IEEE International Conference on Data Mining, Oct. 2007, pp. 43-52.
Bennett,"The Netflix Prize", Aug. 12, 2007, 4 pages.
Bentley,"Multidimensional Binary Search Trees Used for Associative Searching", Sep. 1975, pp. 509-517.
Breiman,"Bagging Predictors", Machine Learning, vol. 24, Issue 2, Available at <http://hpcrd.lbl.gov/~meza/projects/MachineLearning/EnsembleMethods/breiman96bagging.pdf>, Aug. 1996, 20 pages.
Breiman,"Classification Algorithms and Regression Trees", Chapter 11, Classification and Regression Trees, Chapman & Hall, 1984, pp. 246-280.
Candes, "Exact Matrix Completion via Convex Optimization", Found. of Comput. Math., May 2008, 49 pages.
Candes,"The Power of Convex Relaxation: Near-Optimal Matrix Completion", Mar. 8, 2009, 51 pages.
Charlin,"Dynamic Poisson Factorization", Sep. 16, 2015, 8 pages.
Chen,"XGBoost: A Scalable Tree Boosting System", Jun. 10, 2016, 13 pages.
Cremonesi,"Performance of recommender algorithms on top-N recommendation tasks", Jan. 2010, 9 pages.
De"A Multilinear Singular Value Decomposition", Jul. 2000, pp. 1253-1278.
Deng,"Feature Selection via Regularized Trees", The 2012 International Joint Conference on Neural Networks (IJCNN), Mar. 21, 2012, 8 pages.
Dozat,"Incorporating Nesterov Momentum into Adam", Feb. 2016, 6 pages.
Duchi,"Adaptive Subgradient Methods for Online Learning and Stochastic Optimization", available at <http://www.magicbroom.info/Papers/DuchiHaSi10.pdf>, Mar. 2010, 40 pages.
Dziugaite,"Neural Network Matrix Factorization", Dec. 15, 2015, 7 pages.
Eckart,"The Approximation of One Matrix by Another of Lower Rank", Sep. 1936, pp. 211-218.
Efron,"Bootstrap Methods: Another Look at the Jackknife", Jan. 1979, 27 pages.
Francis,"The QR Transformation a Unitary Analogue to the LR Transformation—Part 1", Jun. 1961, pp. 265-271.
Francis,"The QR Transformation—Part 2", Jan. 1962, pp. 332-345.
Freund,"A decision-theoretic generalization of on-line learning and an application to boosting", Journal of Computer and System Sciences, No. 55, Available at <http://www.face-rec.org/algorithms/Boosting-Ensemble/decision-theoretic_generalization.pdf>, Aug. 1997, pp. 119-139.
Freund,"An adaptive version of the boost by majority algorithm", Oct. 2, 2000, 22 pages.
Freund,"Boosting a weak learning algorithm by majority", Jul. 21, 1995, 50 pages.
Friedman,"Greedy function approximation: A gradient boosting machine", Feb. 24, 1999, 39 pages.
Friedman,"Stochastic Gradient Boosting", Mar. 26, 1999, 10 pages.
Glorot,"Understanding the difficulty of training deep feedforward neural networks", Jan. 2010, pp. 249-256.
Golub,"Calculating the Singular Values and Pseudo-Inverse of a Matrix", Jan. 1965, pp. 205-224.
Gonen,"Kernelized Bayesian Matrix Factorization", IEEE Transactions on Pattern Analysis and Machine Intelligence 36.10, Sep. 10, 2014, 9 pages.
Gonen,"Multiple Kernel Learning Algorithms", In: Journal of Machine Learning Research 12 (2011), Jul. 2011, pp. 2211-2268.
Gopalan,"Scalable Recommendation with Hierarchical Poisson Factorization", Jul. 2015, 10 pages.
Gunawardana,"A Survey of Accuracy Evaluation Metrics of Recommendation Tasks", Dec. 2009, pp. 2935-2962.
Hansen,"Neural Network Ensembles", Oct. 1990, pp. 993-1001.
He,"Neural Collaborative Filtering", Aug. 26, 2017, 10 pages.
Hinton,"Reducing the Dimensionality of Data with Neural Networks", Aug. 2006, 4 pages.
Hoffman,"Stochastic Variational Inference", The Journal of Machine Learning Research, vol. 14, No. 1, May 2013, 45 pages.
Hotelling,"Relations Between Two Sets of Variates", Dec. 1936, pp. 321-377.
Householder,"Unitary Triangularization of a Nonsymmetric Matrix", Oct. 1958, pp. 339-342.
Hu,"Collaborative filtering for implicit feedback datasets", Proceedings Eighth IEEE International Conference on Data Mining, Dec. 2008, 10 pages.
Ioffe,"Batch Normalization: Accelerating Deep Network Training by Reducing Internal Covariate Shift", Mar. 2015, 11 pages.
Jordan,"An introduction to variational methods for graphical models", Machine learning, 37(2):183-233, 1999., Nov. 1999, pp. 183-223.
Karamanoloakis,"Item Recommendation with Variational Autoencoders and Heterogeneous Priors", Oct. 7, 2018, 5 pages.
Kingma,"Adam: A Method for Stochastic Optimization", Dec. 22, 2014, 9 pages.
Koren,"Factorization meets the neighborhood: a multifaceted collaborative filtering model", In Proceedings of the 14th ACM SIGKDD international conference on Knowledge discovery and data mining, Aug. 2008, 9 pages.
Koren,"The BellKor Solution to the Netflix Grand Prize", Report from the Netflix Prize Winners, Aug. 2009, 10 pages.
Kullback,"On Information and Sufficiency", Mar. 1951, pp. 79-86.
Lanczos,"An Iteration Method for the Solution of the Eigenvalue Problem of Linear Differential and Integral Operators", Oct. 1950, pp. 255-282.
Lawrence,"Non-linear Matrix Factorization with Gaussian Processes", Jan. 14, 2009, 8 pages.
Lee,"Algorithms for Non-negative Matrix Factorization", in NIPS 13, 2001, Jan. 2001, 7 pages.
Lee,"Learning the Parts of Objects by Non-Negative Matrix Factorization", Nature vol. 401, Oct. 21, 1999, pp. 788-791.
Li,"Collaborative Variational Autoencoder for Recommender Systems", Aug. 13, 2017, 10 pages.
Liang,"Variational Autoencoders for Collaborative Filtering", Feb. 16, 2018, 10 pages.
Liu,"Kernelized Matrix Factorization for Collaborative Filtering", Sep. 27, 2018, 9 pages.
Maas,"Rectifier Nonlinearities Improve Neural Network Acoustic Models", Jun. 2013, 6 pages.
Mason,"Boosting Algorithms as Gradient Descent", Jan. 1999, pp. 512-518.
Mazumder,"Spectral Regularization Algorithms for Learning Large Incomplete Matrices", Apr. 2010, 2287-2322.
Metropolis,"Journal of the American Statistical Association", Sep. 1949, 7 pages.
Michie,""Memo" Functions and Machine Learning", Apr. 1968, pp. 19-22.

(56) References Cited

OTHER PUBLICATIONS

Miller,"Selection of Subsets of Regression Variables", Jan. 25, 1984, pp. 389-425.
Nair,"Rectified Linear Units Improve Restricted Boltzmann Machines", In Proceedings of the 27th International Conference on Machine Learning (ICML-10), Jun. 21, 2010, 8 pages.
Pedregosa,"Scikit-learn: Machine Learning in Python", In: Journal of Machine Learning Research 12 (2011), Oct. 2011, 7 pages.
Piotte,"The Pragmatic Theory solution to the Netflix Grand Prize", Aug. 2009, 92 pages.
Polyak,"Some Methods of Speeding up the Convergence of Iteration Methods", Nov. 1962, pp. 791-803.
Ponomareva,"TF Boosted Trees: A scalable TensorFlow based framework for gradient boosting", Oct. 31, 2017, 4 pages.
Reddi,"On the Convergence of Adam and Beyond", Mar. 2018, 23 pages.
Rendle,"Factorization Machines with libFM", ACM Trans. Intell. Syst. Technol., 3(3), May 2012, 22 pages.
Rendle,"Factorization Machines", Dec. 2010, 6 pages.
Rennie,"Fast Maximum Margin Matrix Factorization for Collaborative Prediction", Proceedings of the 22th International Conference on Machine Learning, 2005., Aug. 2005, 7 pages.
Robbins,"A Stochastic Approximation Method", Sep. 1951, pp. 400-407.
Rumelhart,"Learning Internal Representations by Error Propagation", in Parallel Dist. Proceedings, MIT Press, 1986., Oct. 1986, pp. 318-362.
Salakhutdinov,"Bayesian Probabilistic Matrix Factorization using Markov Chain Monte Carlo", In ICML, Jul. 2008, 8 pages.
Salakhutdinov,"Probabilistic Matrix Factorization", In NIPS, Dec. 2007, 8 pages.
Schapire,"The Strength of Weak Learnability", Jun. 1990, pp. 197-227.
Schwarz,"Estimating the Dimension of a Model", Mar. 1978, pp. 461-464.
Shannon,"A Mathematical Theory of Communication", Reprinted with corrections from The Bell System Technical Journal, vol. 27, Jul. 1948, pp. 5-83.
Srebro,"Maximum-Margin Matrix Factorization", Dec. 2004, 8 pages.
Srebro,"Weighted Low-Rank Approximations", Aug. 2003, 8 pages.
Srivastava,"Dropout: A Simple Way to Prevent Neural Networks from Overfitting", Jun. 2014, pp. 1929-1958.
Tenenbaum,"Separating Style and Content with Bilinear Models", Jun. 2000, pp. 1247-1283.
Tenenbaum,"Separating Style and Content", Proceedings of the Conference on Advances in Neural Information Processing Systems, 1997, Dec. 1996, 9 pages.
Toscher,"Improved Neighborhood-Based Algorithms for Large-Scale Recommender Systems", Aug. 2008, 6 pages.
Toscher,"The BigChaos Solution to the Net ix Grand Prize", Sep. 5, 2009, 52 pages.
Wright,"ranger: A Fast Implementation of Random Forests for High Dimensional Data in C++ and R", Mar. 2017, 17 pages.
Zeiler,"Adadelta: An Adaptive Learning Rate Method", Dec. 22, 2012, 6 pages.
Géron, Aurélien , "Hands-On Machine Learning with Scikit-Learn and TensorFlow", O'Reilly Media, Inc. Sebastopol, California [retrieved Jan. 30, 2023]. Retrieved from the Internet <https://www.oreilly.com/library/view/hands-on-machine-learning/9781491962282/>, Apr. 25, 2017, 718 Pages.

* cited by examiner

DIGITAL EXPERIENCE ENHANCEMENT USING AN ENSEMBLE DEEP LEARNING MODEL

BACKGROUND

As computer technology has advanced computers have become increasingly commonplace in our lives. With this increased presence in our lives, developers and designers strive to provide the best digital experience they can for each user. The digital experience for a user refers to the information that the computer provides to the user and the manner in which that information is provided to the user. For example, the digital experience can include making recommendations for content the user may enjoy (e.g., movies, music, books), providing offers or promotions to the user, the manner in which a web site is displayed (e.g., the colors used, the fonts used), and so forth.

Providing the best digital experience for each user is very beneficial for the users because it provides the users with the digital experience that they want. However, current attempts by designers and developers to provide the best digital experience they can for each user have not been without their problems. One such problem is the accuracy of success in creating such digital experiences is very low, which leads to poor digital experiences for the users. Such poor digital experiences can result in user frustration with their computers and service providers.

SUMMARY

To mitigate the problem of poor digital experiences being provided to users, the digital experience for a user is enhanced based on past interactions of the user with the digital experience. A request for a recommendation to enhance the digital experience for the user is received, the request including an indication of past user interactions of the user with the digital experience. Multiple estimation values are generated, using an estimator ensemble and based on the indication of past user interactions. At least one of the multiple estimation values is generated by each of a singular value decomposition estimator, a neighborhood or clustering estimator, a factorization estimator, a time-aware estimator, a variational autoencoder estimator, and a gradient boosting estimator included in the estimator ensemble. The recommendation to enhance the digital experience for the user is generated, using a neural network, based on the multiple estimation values. The digital experience is enhanced based on the recommendation, and the enhanced digital experience is displayed.

In one or more implementations, an ensemble deep learning model is trained to generated recommendations to enhance the digital experience for a user. A first training data set is obtained, the first training data set including, for each of multiple users, values associated with the user for particular items. The estimators in an estimator ensemble are each trained, using the first training data set, to generate an estimation value. The estimators in the estimator ensemble include a singular value decomposition estimator, a neighborhood or clustering estimator, a factorization estimator, a time-aware estimator, a variational autoencoder estimator, and a gradient boosting estimator. A second training data set is obtained that includes, for each of the multiple users, values associated with the user for particular items. Multiple estimation values are generated, using the estimator ensemble, based on the second training data set. A neural network is trained, using the multiple estimation values, to generate a recommendation to enhance the digital experience for the user. The digital experience is enhanced using the recommendation.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
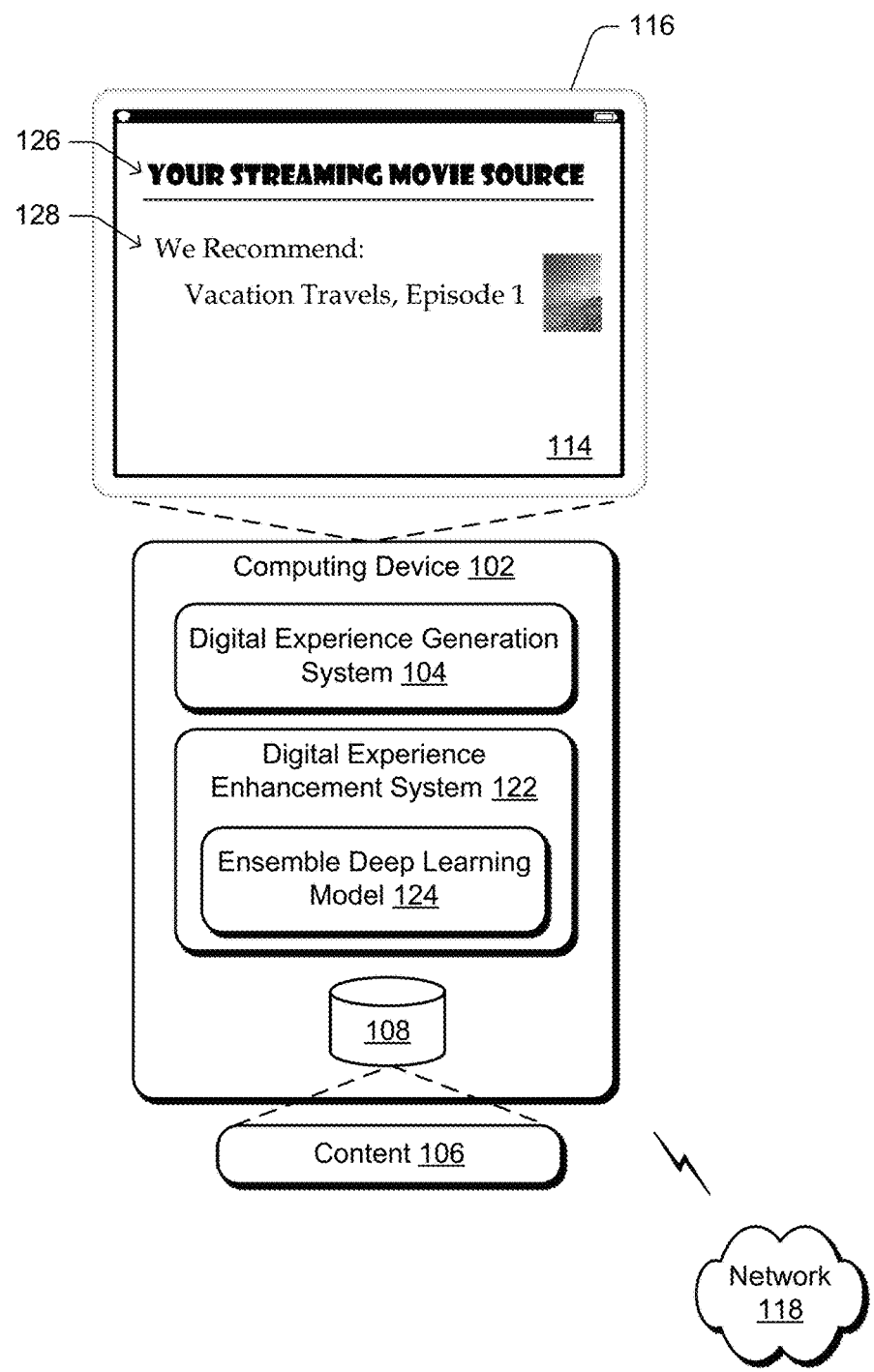
FIG. 1 is an illustration of a digital medium environment in an example implementation that is operable to employ the digital experience enhancement using an ensemble deep learning model techniques described herein.

Digital experience enhancement using an ensemble deep learning model is discussed herein. Generally, a digital experience generation system creates content for display, providing a digital experience to the user. The digital experience generation system leverages an ensemble deep learning model that generates recommendations to enhance the digital experience. These enhancements can take various forms, such as recommendations of movies to watch or books to read, recommendations regarding whether to present offers or advertisements to a user, recommendations for web page display settings (e.g., fonts or colors), and so forth. The ensemble deep learning model is trained to generate recommendations to enhance digital experiences, and the digital experience generation system uses the recommendations to enhance digital experiences.

More specifically, the digital experience enhancement system includes an ensemble deep learning model that is trained to generate a digital experience enhancement recommendation from an enhancement request. The ensemble deep learning model includes an estimator ensemble and a neural network. The ensemble deep learning model receives the enhancement request, which is input to the estimator ensemble. The estimator ensemble uses various different machine learning systems, referred to as estimators, to generate estimator output values. The neural network uses the estimator output values from the estimator ensemble to generate a digital experience enhancement recommendation. The digital experience generation system then uses this digital experience enhancement recommendation to enhance the digital experience.

The ensemble deep learning model can be trained for use in various different digital experience use scenarios, such as movie recommendations, book recommendations, offer or promotion selection, web page display characteristics, and so forth. The ensemble deep learning model is trained in a two-stage process using a first training data set and a second training data set. The first training data set and the second training data set include training data specific to the digital experience use scenario that the ensemble deep learning model is being trained for. For example, if the ensemble deep learning model is being trained to generate movie recommendations, then each sample of training data in the training data set includes data for multiple users and, for each of the multiple users, ratings that the user gave movies in the past. Each sample of training data in the training data set also includes known ratings (the ground truths) for multiple movies that the ensemble deep learning model is generating a prediction for.

In a first stage, the estimators in the estimator ensemble are trained using the first training data set. Each estimator in the estimator ensemble generates an estimator output value for each sample of training data. In the first stage, for each estimator in the estimator ensemble, the estimator output value from the estimator for a sample of training data is compared to the ground truth for the sample of training data. Each estimator includes various filters or nodes with weights that are tuned (e.g., trained) to minimize the loss between the ground truth for the sample of training data and the estimator output value for the sample of training data.

After the first stage is completed, a second stage is performed. In the second stage, the second training data set is provided to the estimators in the estimator ensemble, each of which generates an estimator output value for each sample of training data. However, rather than using those estimator output values to train the estimators in the estimator ensemble, in the second stage the estimator output values are input to the neural network. For each sample of training data in the second training data set, the neural network generates a digital experience enhancement recommendation based on the estimator output values generated by the estimators in the estimator ensemble from the second training data set. The neural network includes various filters or nodes with weights that are tuned (e.g., trained) to minimize the loss between the ground truth for the sample of training data and the digital experience enhancement recommendation for the sample of training data.

Training the ensemble deep learning model in two stages improves the digital experience enhancement recommendations provided by the ensemble deep learning model as a result of the estimators in the estimator ensemble being trained on a set of training data and the neural network being trained on a set of estimator output values (which are recommendations provided by the estimators). Each recommendations is trained to generate estimator output values from the training data set, whereas the neural network is trained to generate recommendations (digital experience enhancement recommendations) from the estimators in the estimator ensemble.

The estimator ensemble includes multiple estimators of different classes or types, also referred to as estimators. These classes of estimators include singular value decomposition (SVD) estimators, neighborhood and clustering estimators, time-aware estimators, factorization estimators, gradient boosting estimators, and variational autoencoder (VAE) estimators.

SVD estimators refer to machine learning systems that generate values (e.g., missing entries in a matrix) using singular value decomposition. Neighborhood and clustering estimators refer to machine learning systems that generate values (e.g., missing entries in a matrix) based on the k nearest entry values to the missing entry or on entry values in a same cluster as the missing entry. Factorization estimators refer to machine learning systems that decompose a matrix into the product of two matrices of lower dimensionality.

Time-aware estimators refer to machine learning systems that leverage time when generating estimator output values. Various times can be leveraged, such as the time that a value was provided by a user, a timespan between an item's availability (e.g., a movie's release) and a user providing a value for the item, and so forth.

Gradient boosting estimators refer to machine learning systems that iteratively add weak learners to an ensemble of machine learning systems. VAE estimators refer to machine learning systems that learn parameters for an autoencoder using variational inference.

The techniques discussed herein improve the operation of a computing device by generating better recommendations on how to enhance the digital experience for a user. The digital experience generation system leverages these recommendations, providing enhanced digital experiences that are better geared towards the user than conventional techniques allow. This generation of enhanced digital experiences provides for efficient use of computational resources by, for example, reducing the amount of time computational resources are expended in having a user search for content he or she desires.

Term Descriptions

These term descriptions are provided for purposes of example only and are not intended to be construed as limiting on the scope of the claims.

The term "digital experience" refers to the user interface that is presented to a user of a computing device. The digital experience includes various different data displayed in different manners (e.g., in different locations, at different times, in different fonts, in different colors, and so forth).

The term "past user interactions" refers to interactions a user has previously had with a digital experience. These past user interactions can include links or web pages selected by the user, preferences set by the user, content (e.g., movie, book, music) recommendations made by the user, feedback provided by the user, and so forth.

The term "item" refers to content that can be displayed or otherwise presented to the user. This content can take various forms, such as visual content, audible content, and so forth. Examples of items include movies, books, songs, offers, promotions, advertisements, web pages, and so forth.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the digital experience enhancement using an ensemble deep learning model techniques described herein. The illustrated environment 100 includes a computing device 102, which may be configured in a variety of ways. The computing device 102, for instance, may be configured as a desktop computer, a server computer, a laptop computer, a mobile device (e.g., assuming a handheld configuration such as a tablet or mobile phone), a wearable device (e.g., augmented reality or virtual reality headsets), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 8.

The computing device 102 is illustrated as including a digital experience generation system 104. The digital experience generation system 104 is implemented at least partially in hardware of the computing device 102 to process and transform content 106, which is illustrated as maintained in storage 108 of the computing device 102. Such processing includes creation of the content 106, and rendering of the content 106 in a user interface 114 for output, e.g., by a display device 116 and/or playback by a speaker of the computing device 102. The content 106 can take various forms, such as image content, video content, mixed media content, and so forth. The storage 108 can be any of a variety of different types of storage, such as random access memory (RAM), Flash memory, solid state drive, magnetic disk drive, and so forth. Although illustrated as implemented locally at the computing device 102, functionality of the digital experience generation system 104 may also be implemented in whole or part via functionality available via the network 118, such as part of a web service or "in the cloud."

The digital experience generation system 104 creates content for display on the user interface 114, providing a digital experience to the user. The digital experience generation system 104 leverages a digital experience enhancement system 122 to facilitate creating the digital experience. The digital experience enhancement system 122 includes an ensemble deep learning model 124 that provides input to the digital experience generation system 104 regarding how to enhance the digital experience for the user. Although illustrated as implemented locally at the computing device 102, functionality of the digital experience enhancement system 122 may also be implemented in whole or part via functionality available via the network 118, such as part of a web service or "in the cloud."

Enhancing the digital experience for the user refers to making the digital experience better for the user. For example, the ensemble deep learning model 124 can generate rankings for content (e.g., movies, music, books) that the digital experience generation system 104 can display to the user, can identify offers or promotions that the digital experience generation system 104 can display to the user, can identify the manner in which a web site provided by the digital experience generation system 104 is displayed (e.g., the colors used, the fonts used), and so forth.

An example of the enhanced digital experience is illustrated in FIG. 1. A web site or page with a title 126 providing a movie or television recommendation 128 is displayed. The digital experience generation system 104 determines which of multiple movie or television programs to recommend based on input from the digital experience enhancement system 122. Furthermore, the font of the title 126 and/or recommendation 128 is also optionally determined by the digital experience generation system 104 based on input from the digital experience enhancement system 122.

Digital Experience Enhancement System Architecture

Figure 2:
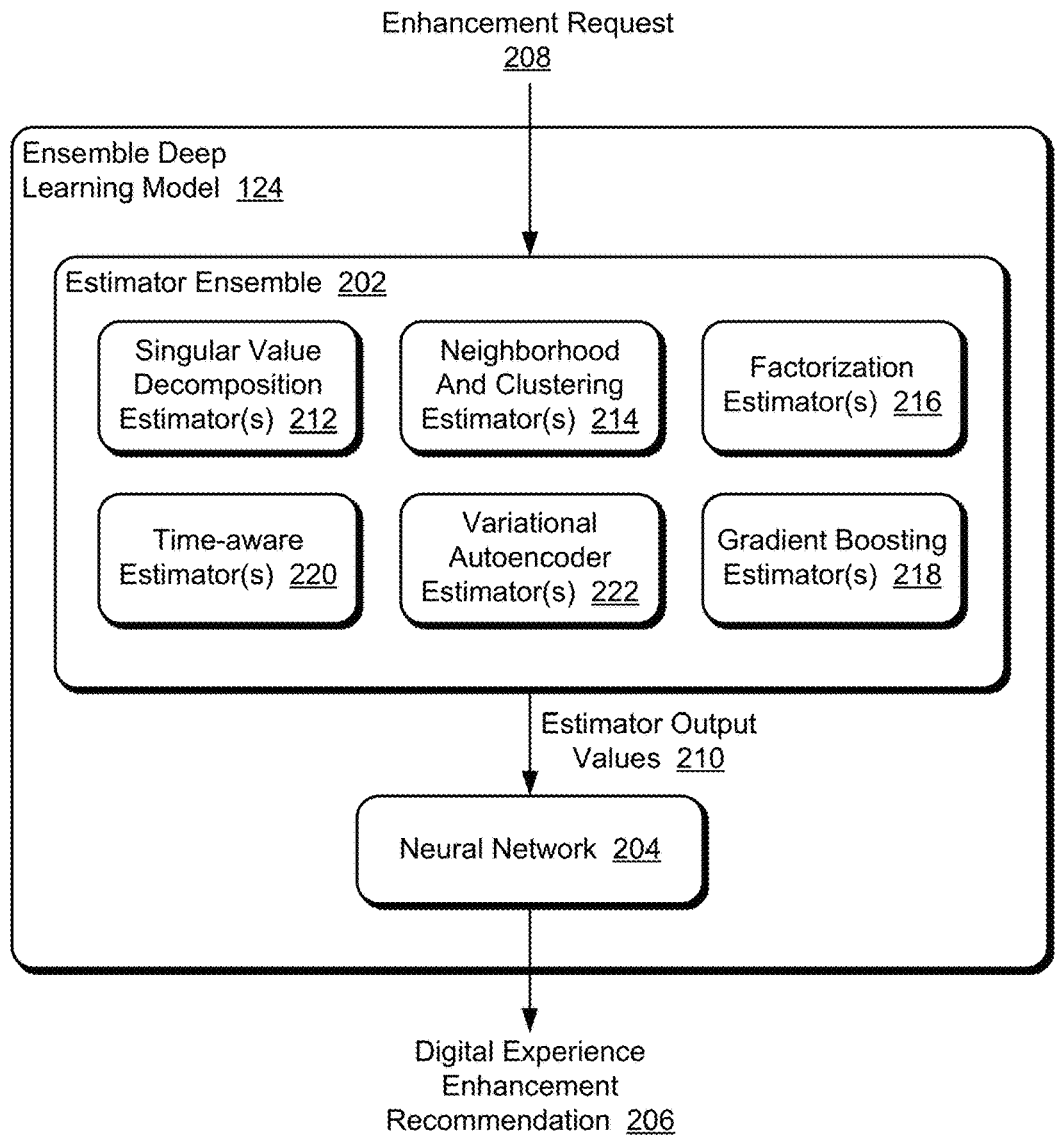
FIG. 2 is an illustration of an example architecture of a digital experience enhancement system.

FIG. 2 is an illustration of an example architecture of a digital experience enhancement system 122. The digital experience enhancement system 122 includes an ensemble deep learning model 124 that includes an estimator ensemble 202 and a neural network 204. The ensemble deep learning model 124 is trained to generate a digital experience enhancement recommendation 206 from an enhancement request 208. Generally, the ensemble deep learning model 124 receives the enhancement request 208, which is input to the estimator ensemble 202. The estimator ensemble 202 uses various different estimators (machine learning systems) to generate estimation values, illustrated as estimator output values 210. The neural network 204 uses the estimator output values 210 to generate the digital experience enhancement recommendation 206.

Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth. Specific types of machine learning systems used by the ensemble deep learning model 124 are discussed in more detail below.

The machine learning systems include various filters or nodes with weights that, during training, are tuned (e.g., trained) to minimize the loss between a known value and a predicted value generated by the machine learning system. Any of a variety of loss functions or algorithms can be used to train the machine learning systems, such as a cross-entropy loss function, a mean squared error, and so forth. Specific loss functions used to train the machine learning systems used by the ensemble deep learning model 124 are discussed in more detail below.

The ensemble deep learning model 124 is trained to generate, given an enhancement request 208, a digital experience enhancement recommendation 206 for a particular digital experience use scenario. The ensemble deep learning model 124 can be used for various different digital experience use scenarios, such as movie recommendations, book recommendations, offer or promotion selection, web page display characteristics, and so forth. The ensemble deep learning model 124 is trained in a two-stage process. In the first stage, the estimators in the estimator ensemble 202 are trained using a set of training data. In the second stage, an additional set of training data is provided to the estimators in the estimator ensemble 202. The estimators in the estimator ensemble 202 generate estimator output values that are used to train the neural network 204. This two-stage process of training the ensemble deep learning model 124 is discussed in more detail below.

The ensemble deep learning model 124 can be viewed as solving a matrix completion problem. In one or more implementations, a matrix M is an m×n matrix where entry $M_{i,j} \in \{1, \ldots, s\}$ contains user i's value for an item j, where values for items range from 1 to s (e.g., 1 being bad, such as a single star or "hated" and 5 being good, such as 5 stars or "loved"). Some users will not have values for all items, so the corresponding entries in the matrix M are empty or zero. For example, the items j may be movies, the matrix entries may be movie rating values, and the value s may be 5. In this example, entry $M_{i,j} \in \{1, \ldots, 5\}$ contains user i's rating value for a movie j. By way of another example, the items may be offers or promotions that were previously presented to the user, the matrix entries may be indications of whether those offers or promotions were accepted by the user (e.g., 0 for accepted, 1 for not accepted), and the value s may be 2. In this example, entry $M_{i,j} \in \{1, \ldots, 2\}$ contains an indication of whether user i previously accepted an offer or promotion j. It should be noted that additional information can be associated with the matrix M and used by various estimators in the estimator ensemble 202. In one or more implementations this additional information includes time information, such as the time that a value was provided by a user, a timespan between an item's availability and a user providing a value for the item, a timespan (e.g., a number of days or years) between an item's availability and a user providing a value for the item, and so forth.

The matrix completion problem aims to recover the matrix M from a subset $\Omega=[m]\times[n]$ of its entries. Given the subset $\Omega$, $\mathcal{P}_\Omega(M)$ denotes the projection of matrix M onto the subset $\Omega$, which amounts to zeroing out unobserved (empty) elements of the matrix M.

The ensemble deep learning model 124 receives the enhancement request 208, which is a request for a recommendation on how to enhance (e.g., improve) the digital experience for a user. The enhancement request 208 includes an identification of a user's past interactions with digital experiences. These past user interactions can be past user interactions with the digital experience generation system 104, or alternatively past user interactions with other systems or devices that the digital experience generation system 104 has access to. The type of past user interactions with digital experiences included in the enhancement request 208 depends on the digital experience use scenario that the ensemble deep learning model 124 is trained for. The past user interactions with digital experiences can be provided as, for example, the matrix M discussed above. The enhancement request 208 also optionally includes an identifier of at least one item (e.g., movie, offer or promotion, etc.) that the recommendation is to be provided for. The ensemble deep learning model 124 generates the digital experience enhancement recommendation 206 based on the enhancement request 208. The value(s) output as the digital experience enhancement recommendation 206 depends on the digital experience use scenario that the ensemble deep learning model 124 is trained for.

The ensemble deep learning model 124 can be used for various different digital experience use scenarios. In one or more embodiments, the digital experience enhancement request 206 generated by the ensemble deep learning model 124 is one of multiple potential values that an item may have. One example digital experience use scenario is movie recommendations, where the ensemble deep learning model 124 is trained to generate movie recommendations. In this example, the enhancement request 208 includes an identifier of at least one movie that the digital experience generation system 104 desires a prediction for, and includes as the past user interactions ratings that the user gave movies in the past. The digital experience enhancement recommendation 206 is a value (e.g., a numerical value from 1 to 5) that is a prediction of what the user would rate a particular movie.

Another example use scenario is offer or promotion selection, where the ensemble deep learning model 124 is trained to generate predictions of whether a user will accept a particular offer or promotion. In this example, the enhancement request 208 includes an identifier of at least one offer or promotion that the digital experience generation system 104 desires a prediction for, and includes as the past user interactions identifiers of offers or promotions that were previously presented to the user and an indication of whether those offers or promotions were accepted by the user. The digital experience enhancement recommendation 206 is a value that is a prediction of whether the user would accept the offer or promotion. Such a value could be a Boolean value (e.g., indicating either Yes or No), a value between 0 and 1 indicating the probability that the user would accept the offer or promotion, and so forth.

Another example use scenario is offer (or advertisement) presentation determination, where the ensemble deep learning model 124 is trained to generate predictions of whether it is better to present an offer (or advertisement) to the user during the digital experience, or better to not present an offer (or advertisement) to the user during the digital experience. In this example, the enhancement request 208 includes as the past user interactions indications of whether the user accepted any offer (or advertisement) during particular types of digital experiences. The digital experience enhancement recommendation 206 is a value that is a prediction of whether it is better to present or not present an offer (or advertisement) to the user during a particular digital experience. Such a value could be a Boolean value (e.g., indicating either Yes or No), a value between 0 and 1 indicating the probability that it would be better to present the offer (or advertisement) to the user during the particular digital experience.

Another example use scenario is web design selection, where the ensemble deep learning model 124 is trained to generate predictions of how to display a web site (e.g., the colors used, the fonts used). In this example, the enhancement request 208 includes as the past user interactions identifiers of settings made or preferences of the user (e.g., color settings, font settings). The digital experience enhancement recommendation 206 is a value that is a prediction of what display settings to use for the web site, such as probability values of each of multiple different colors and/or fonts being preferred by the user.

Another example use scenario is link or venue selection, where the ensemble deep learning model 124 is trained to generate predictions of what link or venue to display a user should be directed to after an initial view or web page is displayed. In this example, the enhancement request 208 includes as the past user interactions identifiers of links or venues that the user selected or viewed. The digital experience enhancement recommendation 206 is a value that is a prediction of what link or venue should be displayed or what additional web page should be displayed after an initial view or web page is displayed, such as probability values of each of multiple different links or venues the user should be directed to.

Another example use scenario is product packaging, where the ensemble deep learning model 124 is trained to generate predictions of how to package a product (e.g., how to display or promote a product as part of the digital experience). In this example, the enhancement request 208 includes identifiers of different product packaging options, and includes as the past user interactions identifiers of product packaging options that were purchased or selected by the user. The digital experience enhancement recommendation 206 is a value that is a prediction of what product packaging option to use for the user, such as probability values of each of multiple different product packaging options being the product packaging option to user for the user.

Another example use scenario is digital experience re-design timing, where the ensemble deep learning model 124 is trained to generate predictions of what time(s) is best to re-design the digital experience (e.g., change a web page design, change links, change offers, etc.). In this example, the enhancement request 208 includes identifiers of different times (e.g., hours of the day and/or days of the week), and includes as the past user interactions indications of, for example, complaints received when digital experiences have been re-designed, how many times users attempted to access the digital experience but were unable to due to a re-design, and so forth. The digital experience enhancement recommendation 206 is a value that is a prediction of what time to re-design the digital experience, such as probability values of each of multiple different times being the best time to re-design the digital experience.

Another example use scenario is determining whether to change the digital experience design based on time or the location of a user, where the ensemble deep learning model 124 is trained to generate predictions of whether to change the digital experience design based on time or the location of a user. In this example, the enhancement request 208 as the past user interactions indications of, for example, complaints received when digital experiences have been changed, how many times users attempted to access the digital experience but were unable to due to a digital experience change, and so forth. The digital experience enhancement recommendation 206 is a value that is a prediction of whether to change the digital experience design based on time or the location of a user. Such a value could be a Boolean value (e.g., indicating either Yes or No), a value between 0 and 1 indicating the probability that it would be better to change the digital experience based on time rather than location of the user, and so forth.

It should be noted that although various examples of digital experience use scenarios that the ensemble deep learning model 124 can be used with are discussed herein, these are merely examples. The ensemble deep learning model 124 can be used with any of numerous different digital experience use scenarios.

The digital experience generation system 104 can use this enhancement recommendation 206 to create and display an enhanced digital experience for the user. In one or more implementations, the enhancement recommendation 206 is a single value (e.g., a movie rating between 1 and 5, a Boolean value (e.g., indicating either Yes or No), a time to perform an action). If the single value satisfies one or more rules or criteria (e.g., is greater than a threshold value, such as 4, or is a Boolean value indicating Yes), then the digital experience generation system 104 generates an enhanced digital experience using the particular content (e.g., displays a movie recommendation, displays an offer or promotion, uses a particular font or color). However, if the single value does not satisfy the one or more rules or criteria (e.g., is not greater than a threshold value, such as 4, or is a Boolean value indicating No), then the digital experience generation system 104 does not use that particular content to generate an enhanced digital experience (e.g., does not display a recommendation for a particular movie, does not display a particular offer or promotion, does not use a particular font or color).

Additionally or alternatively, the enhancement recommendation 206 is a probability distribution on a range of potential values, $\{1, \ldots, s\}$. For example, the enhancement request 206 can indicate the probability that the user would rate a particular movie 1, the probability that the user would rate a particular movie 2, the probability that the user would rate a particular movie 3, the probability that the user would rate a particular movie 4, and the probability that the user would rate a particular movie 5. The digital experience generation system 104 can use his probability distribution in various manners, such as recommending the particular movie only if there is at least a threshold probability (e.g., 80%) that the user would rate the particular movie a 4 or 5.

By way of another example, the enhancement request 206 can indicate the probability that an offer or promotion should be provided to the user and a probability that an offer or promotion should not be provided to the user. The digital experience generation system 104 can use his probability distribution in various manners, such as providing the offer or promotion only if there is at least a threshold probability (e.g., 80%) that the offer or promotion should be provided to the user.

By way of another example, the enhancement request 206 can indicate, for each hour in the day, a probability that a re-design of the digital experience should occur during that hour. The digital experience generation system 104 can use his probability distribution in various manners, such as re-designing the digital experience during a particular hour of the day only if there is at least a threshold probability (e.g., 75%) that the digital experience should be re-designed during that particular hour of the day.

Figure 3:
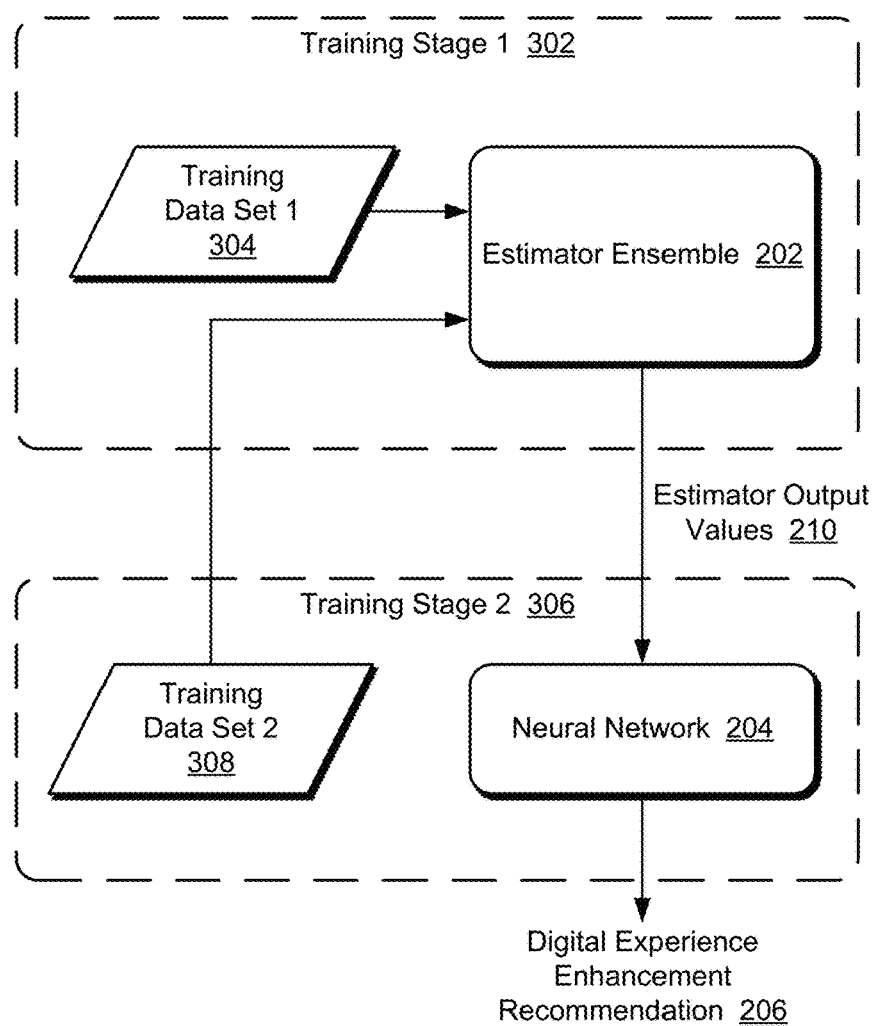
FIG. 3 illustrates an example of training the ensemble deep learning model.

FIG. 3 illustrates an example 300 of training the ensemble deep learning model. As discussed above, the ensemble deep learning model 124 is trained in a two-stage process. Generally, in a first stage 302, the estimators in the estimator ensemble 202 are trained using a first training data set 304. In a second stage 306, a second training data set 308 is provided to the estimators in the estimator ensemble 202. In the second stage the estimators in the estimator ensemble 202 generate estimator output values 310 that are used to train the neural network 204. The first training data set 304 and the second training data set 308 can be different training data sets, or alternatively can at least partially overlap (e.g., contain some of the same samples).

The first training data set 304 and the second training data set 308 include training data specific to the digital experience use scenario that the ensemble deep learning model 124 is being trained for. For example, if the ensemble deep learning model 124 is being trained to generate movie recommendations, then each sample of training data in the training data set includes data for multiple users and, for each of the multiple users, ratings that the user gave movies in the past. Each sample of training data in the training data set also includes known ratings (the ground truths) for multiple movies that the ensemble deep learning model 124 is generating a prediction for. The example 300 is discussed with reference to ensemble deep learning model 124 being trained to generate movie recommendations, however it should be noted that the ensemble deep learning model 124 can be trained for various other digital experience use scenarios as discussed above.

In the first stage 302, the machine learning systems in the estimator ensemble 202 are trained using the first training data set 304. In one or more implementations, the machine learning systems in the estimator ensemble 202 are trained individually. Additionally or alternatively, multiple machine learning systems in the estimator ensemble 202 can be trained concurrently. Each machine learning system in the estimator ensemble 202 generates an estimator output value 210 for each sample of training data. In the first stage 302, for each estimators in the estimator ensemble 202, the estimator output value 210 from the machine learning system for a sample of training data is compared to the ground truth for the sample of training data. Each estimator includes various filters or nodes with weights that are tuned (e.g., trained) to minimize the loss between the ground truth for the sample of training data and the estimator output value 210 for the sample of training data.

After the first stage 302 is completed, the second stage 306 is performed. In the second stage 306, the neural network 204 is trained using the second training data set 308. The second training data set 308 is input to the estimators in the estimator ensemble 202, each of which generates an estimator output value 210 for each sample of training data. However, rather than using those estimator output values 210 to train the estimators in the estimator ensemble 202, in the second stage 306 the estimator output values 210 are input to the neural network 204. For each sample of training data in the second training data set 308, the neural network 204 generates a digital experience enhancement recommendation 206 based on the estimator output values 210 generated by the estimators in the estimator ensemble 202 from the second training data set 308. The neural network 204 includes various filters or nodes with weights that are tuned (e.g., trained) to minimize the loss between the ground truth for the sample of training data and the digital experience enhancement recommendation 206 for the sample of training data.

The first stage 302 and the second stage 306 can be fed with samples from the first training data set 304 and the second training data set 308 in various batch sizes (e.g., 512 or 4096 samples). In situations where there are numerous samples of training data (e.g., millions of samples of training data), the samples from the first training data set 304 and the second training data set 308 can be fed with samples in a single epoch. Additionally or alternatively, multiple epochs can be used.

Returning to FIG. 2, the estimator ensemble 202 includes estimators of different classes or types. These classes of estimators are illustrated as singular value decomposition (SVD) estimators 212, neighborhood and clustering estimators 214, factorization estimators 216, gradient boosting estimators 218, time-aware estimators 220, and variational autoencoder (VAE) estimators 222. Each of these machine learning system or estimators (which may also be referred to as models) output an estimate of the digital experience enhancement recommendation as an estimator output value 210. Various different estimators are discussed herein. In one or more implementations, the estimator ensemble 202 includes all of the estimators discussed herein. Additionally or alternatively, additional estimators may be added to the estimator ensemble 202, or in some situations one or more estimators discussed herein is not included in the estimator ensemble 202.

SVD estimators 212 refer to estimators that replace missing entries from a matrix (e.g., the matrix M discussed above) using singular value decomposition. These estimators can operate on the matrix M itself, or alternatively on a matrix of residuals obtained by subtracting the average of the row and column mean from each entry in the matrix M.

The SVD of the matrix M is $M=U\Sigma V^T$, where r is the rank of the matrix M, U is an m×r matrix with orthonormal columns, $\Sigma$ is an r×r diagonal matrix of positive entries, and V is an r×n matrix with orthonormal columns.

The nuclear norm of the matrix M is given as $$\|M\|_* = \sum_{k=1}^{r} \sigma_k(M),$$

where $\sigma_k$ (M) denotes the kth singular value of M. A soft-thresholded SVD algorithm generates the SVD by minimizing:

$$1/2 \; \mathcal{P}_\Omega(\hat{M}-M)\|_F^2 + \lambda \|M\|_*$$

where $\hat{M}$ denotes the estimate for M, $\|\cdot\|_F$ denotes the Frobenius matrix norm that takes the square root of the sum of squares of the matrix entries. Additional information regarding the soft-thresholded SVD algorithm can be found in "Spectral regularization algorithms for learning large incomplete matrices," by R. Mazumder, T. Hastie, and R. Tibshirani, Journal of Machine Learning Research, vol. 11, pp. 2287-2322, 2010, which is hereby incorporated by reference herein in its entirety.

In one or more implementations, the SVD estimators 212 include multiple estimators using the IRLB algorithm and the augmented implicitly restarted Lanczos bidiagonalization algorithm. These multiple estimators include one estimator using the IRLB algorithm and the augmented implicitly restarted Lanczos bidiagonalization algorithm having a matrix rank of 5, another estimator using the IRLB algorithm and the augmented implicitly restarted Lanczos bidiagonalization algorithm having a matrix rank of 7, and another estimator using the IRLB algorithm and the augmented implicitly restarted Lanczos bidiagonalization algorithm having a matrix rank of 13. Additional information regarding the IRLB algorithm and the augmented implicitly restarted Lanczos bidiagonalization algorithm can be found in "An iteration method for the solution of the eigenvalue problem of linear differential and integral operators," by C. Lanczos, Journal of Research of the National Bureau of Standards, vol. 45, no. 4, pp. 255-282, 1950, and "Augmented implicitly restarted Lanczos bidiagonalization methods," by J. Baglama and L. Reichel, SIAM Journal of Scientific Computing, vol. 27, no. 1, pp. 19-42, 2005, both of which are hereby incorporated by reference herein in their entirety.

In one or more implementations, the SVD estimators 212 include multiple estimators using the Soft-Impute (also referred to as softimpute) algorithm. These multiple estimators include one estimator using the Soft-Impute algorithm having a matrix rank of 5, another estimator using the Soft-Impute algorithm having a matrix rank of 7, another estimator using the Soft-Impute algorithm having a matrix rank of 13, and another estimator using the Soft-Impute algorithm having a matrix rank of 100. Additional information regarding the Soft-Impute algorithm can be found in "Spectral regularization algorithms for learning large incomplete matrices," by R. Mazumder, T. Hastie, and R. Tibshirani, Journal of Machine Learning Research, vol. 11, pp. 2287-2322, 2010.

In one or more implementations, the SVD estimators 212 include an estimator using a baseline algorithm. The baseline algorithm fills in each empty entry in the matrix M with a value that is the average of the row average for that entry and the column average for that entry. For example, for an empty entry $M_{i,j}$, the average of entries in the row $M_i$ is calculated and the average of entries in the column $M_j$ is calculated. The value of the empty entry $M_{i,j}$ is then the average of the average of entries in the row $M_i$ and the average of entries in the column $M_j$.

Neighborhood and clustering estimators 214 refer to estimators that replace a missing entry from a matrix (e.g., the matrix M discussed above) based on the k nearest entry values to the missing entry or on entry values in a same cluster as the missing entry. The calculated values can be, for example, an average of the k nearest entry values or an average of the entry values in the cluster. These estimators can operate on the matrix M itself, or alternatively on a matrix of residuals obtained by subtracting the average of the row and column mean from each entry in the matrix M.

In one or more implementations, the neighborhood and clustering estimators 214 include an item k-nearest neighbors (k-NN) estimator. The item k-NN estimator considers the r-dimensional rows of V from the soft-thresholded SVD decomposition of the projection $\mathcal{P}_\Omega(M)$. These vectors give a dense, low-dimensional (e.g., r=5) representation for each item. A k-d tree is used to find the k=10 (or alternatively k=1000) nearest neighbors for each item according to the Euclidean metric. The Euclidean metric measures the distance between two items as the distance between the corresponding sparse column vectors in the projection $\mathcal{P}_\Omega(M)$. For a given (user, item)-pair, a determination is made whether any of the item's neighbors have a non-zero value (e.g., are not empty), and if so a weighted average is calculated over the values of the item's neighbors. The weights are proportional to the exponentiated negative distance between the item and its neighbors. Additional information regarding k-d trees can be found in "Multidimensional binary search trees used for associative searching," by J. L. Bentley, *Communications of the ACM*, vol. 18, no. 9, pp. 509-517, 1975, which is hereby incorporated by reference herein in its entirety.

It should be noted that a smaller value for k restricts to only the most similar neighbors, and so decreases the bias of this estimate. However, it also increases the chance that very few (or none) of the neighbors will have a non-zero value. In the case that too few nearest neighbors to an item have a non-zero value (e.g., fewer than two of the k=10 nearest neighbors to a movie has a rating), then this estimator does not return a value. In such situations, the neural network 204 generates the digital experience enhancement recommendation 206 based on the estimator output values 210 from the other estimators in the estimator ensemble 202. This allows the item k-NN estimator to abstain from generating an estimator output value 210 when it is not sufficiently confident, and falls back to estimators that will be more reliable for a given (user, item)-pair.

In one or more implementations, the neighborhood and clustering estimators 214 includes a user k-means estimator. The user k-NN estimator considers the r-dimensional rows of U from the soft-thresholded SVD decomposition of the projection $\mathcal{P}_\Omega(M)$. These vectors give a dense, low-dimensional (e.g., r=5) representation for each user. K-means clustering is used to partition the users into k clusters (e.g., k=480), e.g., where each user belongs to the cluster with the nearest mean. For k-means clustering, each user is represented as a multi-dimensional vector (e.g., a 5-dimensional vector) and k-means clustering is applied to these vectors. These vectors are the left singular vectors from the singular value decomposition of the training data, which capture information about a user's previously expressed preferences from the training data. This process assigns each vector to one of k clusters in a way that attempts to minimize the average intra-cluster variance (the average over clusters of the average distance from each vector in a cluster to the centroid of that cluster). In one or more implementations, this assignment is made using Lloyd's algorithm, which alternates between assigning each vector to the cluster having the nearest centroid and recalculating the centroids based on the new assignments. For a given (user, item)-pair, a determination is made whether any other users in the user's cluster have provided a value for the item, and if so an average is calculated over the values provided by the other users in the cluster. The user k-NN estimator assumes that users in the same cluster have similar tastes, so to predict a user's value for a given item, the user k-NN estimator examines the values users in the same cluster provided for that item.

It should be noted that in the case that too few other users in the cluster have provided a value for an item (e.g., fewer than 20% of the other users in the cluster have provided a value for the item), then this estimator does not return a value. In such situations, the neural network 204 generates the digital experience enhancement recommendation 206 based on the estimator output values 210 from the other estimators in the estimator ensemble 202. This allows the user k-means estimator to abstain from providing an estimator output value 210 when it is not sufficiently confident, and elegantly falls back to estimators that will be more reliable for a given (user, item)-pair.

In one or more implementations, the neighborhood and clustering estimators 214 includes a neighboring average estimator, which averages the values generated by the item k-NN estimator and the user k-means estimator. For a given (user, item)-pair, the neighboring average estimator averages the values generated by the item k-NN estimator and the user k-means estimator for that (user, item)-pair. If one of the item k-NN estimator and the user k-means estimator does not return a value, the neighboring average estimator uses the value by the one of the item k-NN estimator and the user k-means estimator that did return a value. If neither the movie k-NN estimator nor the user k-means estimator returns a value, then the neighboring average estimator does not return a value. In such situations, the neural network 204 generates the digital experience enhancement recommendation 206 based on the estimator output values 210 from the other estimators in the estimator ensemble 202.

In one or more implementations, the neighborhood and clustering estimators 214 includes a cross k-NN of users and items estimator. The cross k-NN estimator considers the r-dimensional rows of V from the soft-thresholded SVD decomposition of the projection $\mathcal{P}_\Omega(M)$. These vectors give a dense, low-dimensional (e.g., r=5) representation for each item. A k-d tree is used to find the k=100 nearest neighbors for each item according to the Euclidean metric. The cross k-NN estimator also considers the r-dimensional rows of U from the soft-thresholded SVD decomposition of the projection $\mathcal{P}_\Omega(M)$. These vectors give a dense, low-dimensional (e.g., r=5) representation for each user. A k-d tree is used to find the k=100 nearest neighbors for each item according to the Euclidean metric.

The cross k-NN estimator finds neighbors for both rows and columns of the projection $\mathcal{P}_\Omega(M)$, and then aggregates values along the sub-matrix consisting of the cross product between neighboring users and neighboring items. In other words, to generate a value for user i on item j, the cross k-NN estimator finds indices $\mathcal{N}_{u_i} \subset [m]$ corresponding to the neighbors of user i, and indices $\mathcal{N}_{v_j} \subset [n]$ corresponding to the neighbors of item j, and computes a weighted average over the available values in $\mathcal{N}_{u_i} \times \mathcal{N}_{v_j}$. The weights are calculated using a normalized kernel function that is proportional to $$e^{(\text{distance in user space})^2 - (\text{distance in item space})^2}$$

The weights account for distances in user-space and item-space. In this manner, the k-NN estimator leverages values for similar items provided by similar users.

It should be noted that in the case that too few neighboring users have provided values for too few neighboring items (e.g., fewer than 20% of the neighboring items have non-zero value), then this estimator does not return a value. In such situations, the neural network 204 generates the digital experience enhancement recommendation 206 based on the estimator output values 210 from the other estimators in the estimator ensemble 202. This allows the cross k-NN estimator to abstain from providing an estimator output value 210 when it is not sufficiently confident, and elegantly falls back to estimators that will be more reliable for a given (user, item)-pair.

In one or more implementations, the neighborhood and clustering estimators 214 includes a time-aware cross k-NN estimator. The time-aware cross k-NN estimator is analogous to the cross k-NN estimator, except that the weighted average computed over the available values in $\mathcal{N}_{u_i} \times \mathcal{N}_{v_j}$ account for distances in user-space and item-space, as well as the difference in time between values. The weights are calculated using a normalized kernel function that is proportional to $$e^{-(\text{distance in user space}) - (\text{distance in item space}) - (\text{distance in time})}$$

Factorization estimators 216 refer to estimators that decompose the matrix M into the product of two matrices of lower dimensionality. More specifically, $\hat{M} = UV^T$ is estimated where U is an n×k matrix of user factors and V is an m×k matrix of item factors.

In one or more implementations, the factorization estimators 216 include a weighted alternating least squares estimator. The weighted alternating least squares estimator is a weighted matrix factorization estimator that accounts for the implicit preference a user gives to an item through the act of using the item (e.g., if the item is a movie, then watching and rating the movie). The weighted alternating least squares estimator is initialized from the SVD decomposition by taking, for example, $U\sqrt{\Sigma}$, $\Sigma V$ from one of the SVD estimators 212 rather than random values. The weighted alternating least squares estimator seeks:

$$\hat{U}, \hat{V} = \underset{U, V}{\arg\min} \|\mathcal{P}_\Omega(\sqrt{W} \odot (UV^T - M))\|^2 + \lambda(\|U\|^2 + \|V\|^2)$$

where W denotes the number of items a user has provided values for and $\odot$ denotes element-wise multiplication. Additional information regarding the weighted alternating least squares estimator can be found in "Collaborative filtering for implicit feedback datasets," by Y. Hu, Y. Koren, and C. Volinsky, in *IEEE International Conference on Data Mining*, 2008, pp. 263-272, which is hereby incorporated by reference herein in its entirety.

In one or more implementations, the factorization estimators 216 include a neural network matrix factorization estimator. The neural network matrix factorization estimator is a feedforward fully-connected neural network mapping with learned representation vectors for users and items through the network to predict the corresponding value for an item. Learned estimator parameters for the neural network matrix factorization estimator include m user vectors in $\mathbb{R}^f$, n item vectors in $\mathbb{R}^r$, and all parameters for the neural network. User vectors are initialized with the U matrix and the item vectors are initialized with the V matrix from the soft-thresholded SVD estimator. The neural network parameters optionally receive Glorot uniform initialization.

During training of the neural network matrix factorization estimator, for each batch three training steps are performed: neural network parameters are updated, user representations are updated, and item representations are updated. Tikhonov L2-regularization is applied to U and V. For all parameter updates, the Adam optimizer is used. The mean squared error (MSE) is used as the objective function to minimize during training. The neural network uses leaky rectified linear unit activation, and applies dropout after the first hidden layer to prevent overfitting.

There separate optimizations are performed for training the neural network matrix factorization estimator. The neural network matrix factorization estimator uses a model:

value($user_i$, $item_j$) = neural network (neural network parameters, user representation[i, :], item representation [j, :])

where neural network parameters, user representation, and item representation are all parameters that the neural network matrix factorization estimator learns. This model is over-specified, meaning that the complete set of parameters is higher-dimensional than it strictly needs to be, so we use regularization. The training for neural network parameters minimizes MSE on the training batch for its loss. The training for user representation and item representation both minimize MSE plus 0.1 times the L2 norm of the parameters themselves as a form of regularization. The neural network matrix factorization estimator fuses the training of these three parameters: it calculates and collects all the derivatives it will need from a given training batch during a single evaluation and performs all training updates concurrently.

Different neural network matrix factorization estimators can be initialized in different manners. For example, one neural network matrix factorization estimator is initialized with the U matrix and the V matrix from an SVD estimator 212 using the Soft-Impute algorithm having a matrix rank of 13, and is trained with a single epoch (each training data point is presented to the network once). Another neural network matrix factorization estimator is initialized with the U matrix and the V matrix from an SVD estimator 212 using the Soft-Impute algorithm having a matrix rank of 13, and is trained with 10 training epochs (each training data point is presented to the network 10 separate times). Another neural network matrix factorization estimator is initialized with the U matrix and the V matrix from an SVD estimator 212 using the IRLB algorithm and the augmented implicitly restarted Lanczos bidiagonalization algorithm having a matrix rank of 13.

Additional information regarding neural network matrix factorization can be found in "Neural network matrix factorization", by G. K. Dziugaite and D. M. Roy, 2015. eprint: arXiv:1511.06443, and "Neural collaborative filtering," by X. He, L. Liao, H. Zhang, L. Nie, X. Hu, and T.-S. Chua, in

*International World Wide Web Conference*, 2017, pp. 173-182, both of which are hereby incorporated by reference in their entirety.

In one or more implementations, the factorization estimators 216 include a Gaussian matrix factorization estimator. The Gaussian matrix factorization estimator is a probabilistic matrix factorization estimator where a generative graphical estimator is specified and the maximum a posteriori parameters are found or Gibbs sampling in a Bayesian setting is performed. The Gaussian matrix factorization models $$M_{ij} \sim^{i.i.d} \mathcal{N}(U_i V_i^T + b_{i,j}, \sigma^2)$$

where (similar to the discussions above) U is an n×k matrix of user factors and V is an m×k matrix of item factors, $b_{ij}$ denotes the average of the mean rating from user i and the mean value of item j, and account for user- and item-effects, and $\sigma^2=1$. In the Gaussian matrix factorization estimator, U and V are learned to maximize the log likelihood of the observed data.

Additional information regarding the Gaussian matrix factorization estimator can be found in "Probabilistic matrix factorization," by R. R. Salakhutdinov and A. Mnih, in *Advances in Neural Information Processing Systems*, 2008, pp. 1257-1264, and "Bayesian probabilistic matrix factorization using markov chain monte carlo," by R. Salakhutdinov and A. Mnih, in *International Conference on Machine Learning*, 2008, pp. 880-887, both of which are hereby incorporated by reference herein in their entirety.

In one or more implementations, the factorization estimators 216 include a Poisson matrix factorization estimator. The Poisson matrix factorization estimator is a probabilistic matrix factorization estimator that assumes each entry in the matrix M is drawn from a Poisson distribution—an exponential family distribution over non-negative integers—whose parameter is a linear combination of the corresponding user preferences and item attributes.

In the Poisson matrix factorization estimator, the following estimator is learned:

$$M_{i,j} \sim^{i.i.d} \text{Poisson}(U_i V_i^T + b_{ij})$$

where $\hat{M}_{i,j} = \mathbb{E}[\hat{X}_{ij} | \hat{X}_{ij} \in \{1, \ldots, s\}]$ is predicted and $\hat{X}_{ij} \sim \text{Poisson}(\hat{U}_i \hat{V}_j^T + b_{ij})$ and $\hat{U}, \hat{V}$ denote the learned estimator parameters. The Poisson matrix factorization estimator is trained to minimize the batch negative log likelihood of the data under the probabilistic model. In this way, the Poisson matrix factorization estimator seeks parameters that conditionally make the observed data most likely. Additional information regarding the Poisson factorization estimator can be found in "Scalable recommendation with hierarchical poisson factorization," by P. Gopalan, J. M. Hofman, and D. M. Blei, in *Conference on Uncertainty in Artificial Intelligence*, 2015, pp. 326-335, which is hereby incorporated by reference herein in its entirety.

In one or more implementations, the factorization estimators 216 include a factorization machine estimator. The factorization machine estimator estimates all nested variable interactions (comparable to a polynomial kernel in a Support Vector Machine (SVM)), but uses a factorized parametrization instead of a dense parametrization like in SVMs.

A factorization machine estimator of second degree learns a regression estimator of:

$$\hat{y}(x) = w_0 + \sum_{k=1}^{l} w_i x_i + \sum_{1 \leq i < j \leq l} \langle v_i, v_j \rangle x_i x_j$$

for parameters $w_k \in \mathbb{R}$, k=1, ..., l, and $v_k \in \mathbb{R}^l$, k=1, ..., l. Factorization machine estimators are designed for sparsity. In a factorization machine estimator 216, $x \in \mathbb{R}^{m+n}$ denotes a one-hot vector representation for the user concatenated with a one-hot vector representation for the item. The factorization machine estimator is trained to minimize the MSE loss with L2 regularization.

Additional information regarding the factorization machine estimator can be found in "Factorization machines," by S. Rendle, in *IEEE International Conference on Data Mining*, 2010, pp. 995-1000, and "Factorization machines with libfm," by S. Rendle, *ACM Transactions on Intelligent Systems and Technology*, vol. 3, no. 3, 2012, both of which are hereby incorporated by reference herein in their entirety.

Gradient boosting estimators 218 refer to estimators that iteratively add weak learners to an ensemble of machine learning systems. The gradient boosting estimator is itself an ensemble of multiple machine learning systems and weak learners (machine learning systems) are iteratively added to improve the gradient boosting estimator.

In an example gradient boosting estimator, values for a (user, item) pair as a function of their representations in thresholded SVD feature space are learned. A loss function $L(\bullet, \bullet)$ and a training method, such as regression trees, are used to train new weak learners $h_i$. This loss function is mean square error plus a regularization term to penalize the model complexity. The ensemble is initialized at a constant value $a_0$ minimizing loss on the training set $\{(x_i, y_i)\}_{i=1}^n$:

$$F_0(x) = a_0 = \underset{a}{\arg\min} \left\{ \sum_{i=1}^n L(y_i, a) \right\}$$

At step t≥1 of the estimator, we take the current ensemble, $$F_{t-1}(x) = a_0 + \sum_{j=1}^{t-1} a_j h_j(x),$$

a linear combination of weak learners, and compute the pseudo-residuals $$r_{t,i} = -\frac{\partial L(y_i, \hat{y}_i)}{\partial \hat{y}_i} \bigg|_{\hat{y}_i = F_{t-1}(x_i)}.$$

A new weak learner $h_t$ is trained on the set of pseudo-residuals $\{(x_i, r_{t,i})\}_{i=1}^n$ and the multiplier $$a_t = \underset{a}{\arg\min} \left\{ \sum_{i=1}^n L(y_i, F_{t-1}(x_i) + a h_t(x_i)) \right\}$$

is found. The new ensemble is then $$F_t(x) = F_{t-1}(x) + a_t h_t(x).$$

Additional information regarding gradient boosting can be found in "Xgboost: A scalable tree boosting system," by T. Chen and C. Guestrin, in *International Conference on Knowledge Discovery and Data Mining*, 2016, pp. 785-794, which is hereby incorporated by reference herein in its entirety.

Time-aware estimators 220 refer to estimators that leverage time when generating estimator output values. Various times can be leveraged, such as the time that a value was provided by a user, a timespan between an item's availability (e.g., a movie's release) and a user providing a value for the item, and so forth.

In one or more implementations, the time-aware estimators 220 include a time-aware neural factorization estimator. The time-aware neural factorization estimator is a version of the neural network matrix factorization estimator discussed above that includes time components as inputs to the neural network. In one or more implementations these time components include a time (e.g., time of day and/or date) that a value was provided by a user (e.g., a time the user provided a movie rating), optionally normalized to lie in [0,1]. Additionally or alternatively, these time components include an indication of a timespan (e.g., a number of days or years) between an item's availability and a user providing a value for the item (e.g., a timespan between a movie's release and the user providing a rating for the movie). The time components are provided as an additional input to the network. However, as opposed to the item vector (that is treated as a parameter and optimized), time is treated as known and exogenous.

Updates to the U matrix and the V matrix can be sparse (e.g., any given row only updates a handful of times for each run through the data set). Accordingly, a Nesterov Momentum optimizer is used to train the U matrix and the V matrix, while continuing to apply the Adam optimizer for updating the neural network parameters (all of which are updated at each training step). The Adam optimizer tweaks the learning rate for each parameter depending on a window of previous gradients for each parameter. This approach may not be best when updates to a given parameter occur only sporadically, so the Nesterov Momentum optimizer is used to train the U matrix and the V matrix. The objective function remains MSE to minimize during training.

In one or more implementations, the time-aware estimators 220 include a neural one-hot factorization with time component estimator.

In the neural one-hot factorization with time component estimator, a neural network receives as inputs takes user- and item representations, as well as one or more time features. In one or more implementations these time features include year that the item was first available (e.g., release year for a movie). Additionally or alternatively, these time features include a time (e.g., time of day and/or date) that a value was provided by a user (e.g., a time the user provided a movie rating). Additionally or alternatively, these time features include a time (e.g., time of day and/or date) that the user provided his or her first value (e.g., a time the user provided his or her first movie rating). The neural network outputs a probability distribution on the range of possible item values, $\{1, \ldots, s\}$.

Training of the neural one-hot factorization with time component estimator minimizes the cross-entropy loss between a one-hot vector representing the ground truth and the estimator's predicted distribution. In addition to providing estimates for (user, movie, time)-values, the neural one-hot factorization with time component estimator allows prediction of the variance or uncertainty of the generated estimate. Using a probability distribution provides more information about the uncertainty of an estimate than a point estimate provides. For example, the variance of the estimate can be determined, a chance that a user would provide one of two different values (e.g., a movie rating of 4 or 5), and so forth. Thresholding is then optionally used to exclude highly uncertain estimates (e.g., estimates with an uncertainty greater than a threshold amount, such as 70%) from the estimator output values 210.

A probability distribution can be used by the digital experience generation system 104 in various manners, such as to safeguard against "risky" behavior. For example, consider movie A that the probability distribution indicates has a 0.5 chance of being rated 1 and a 0.5 chance of being rated 5, and movie B that the probability distribution indicates will almost certainly be rated 3. A point estimate for the mean of the distribution would see no difference between movies A and B, but a distributional estimate would include information that there's a 50% chance the user will greatly dislike movie A.

In one or more implementations, the time-aware estimators 220 include a time-binned SVD estimator. The time-binned SVD estimator partitions the training data into approximately equally sized bins or groups based on the time stamps associated with them, so values provided at around the same time will be placed in the same or a neighboring bin. A separate SVD estimator is trained for each bin. Any of a variety of different SVD estimators can be used with the time-binned SVD estimator, such as any of the SVD estimators 212 discussed above.

Each of these trained SVD estimators can then be used to predict a value for a given (user, movie, time) tuple, and a weighted average formed over all such predicted values. The given (user, movie, time) tuple is placed into one of the bins, and a higher weight is given to the predicted value from the SVD trained for the bin into which the tuple was placed. Predicted values from all other bins can be given the same lower weight. Additionally or alternatively, the weight given to a predicted value from a particular bin can be based on how close a time associated with the particular bin (e.g., an average or mean time for data in the particular bin) is to a time associated with the bin into which the tuple was placed (e.g., an average or mean time for data in the bin) or the time in the tuple. For example, lower weights can be given to bins having an associated time that is further from the time associated with the bin into which the tuple was placed (or the time in the tuple).

In one or more implementations, the time-aware estimators 220 include a tensor factorization estimator. In the tensor factorization estimator, data is partitioned into bins analogous to the time-binned SVD estimator. After partitioning the data into time bins, the tensor factorization estimator views the data as a value tensor, where the users by items matrix now extends along a third, temporal dimension. This allows the tensor factorization estimator to perform time-aware factorization into three tensors, one for each dimension.

A generalization of SVD to tensors, known as the minimal canonical polyadic (CP) decomposition, yields the estimator:

$$M = \sum_{i=1}^{r} \lambda_i a_i^1 \otimes a_i^2 \otimes a_i^3$$

The tensor factorization estimator is initialized with higher-order SVD and trained using alternating least squares to minimize the mean square error of the decomposition, using a matrix rank of 4.

VAE estimators 222 refer to estimators that learn parameters for an autoencoder using variational inference. In one or more implementations, the VAE estimators 222 include a VAE estimator. An autoencoder estimators the identity function with a neural network. The architecture of an autoencoder includes a hidden layer of relatively small dimensionality that serves as an information bottleneck. Upon training, the output from this layer yields a lower-dimensional representation of the original data. For example:

$$X \xrightarrow{f} Z \xrightarrow{g} \hat{X}$$

where $X, \hat{X} \in \mathbb{R}^d$ and $Z \in \mathbb{R}^m$ for $m \ll d$. The neural networks $f: \mathbb{R}^d \to \mathbb{R}^m$ and $g: \mathbb{R}^m \to \mathbb{R}^d$ are trained so that $g \circ f$ approximates the identity on n-dimensional data. An objective function minimizes the loss between X and $\hat{X}$. This implies that $f(x) \in \mathbb{R}^m$ contains the most relevant information required to reconstruct X.

If f, g are linear maps and the $L_2$ loss is imposed on the reconstruction, autoencoding solves for the principal components from PCA. In this way, autoencoding can be considered as a nonlinear extension of PCA.

In Bayesian statistics, variational inference approximates intractable integrals (expectations) with optimization, by substituting the integrand (probability distribution) for the closest member of a parametrized family of distributions. Given a conditional distribution p(z|x), the following can be calculated:

$$\mathbb{E}[f(z)|x] = \int f(z)p(z|x)dx$$

where the integral on the right hand side cannot be solved analytically. A variational distribution $q_0(z|x)$ is introduced to approximate p(z|x), for which $$\int f(z)q_0(z|x)dx$$

becomes a tractable approximation to the integral of interest. Parameters θ are found to minimize $$D_{KL}(q_0(z|x)\|p(z|x))$$

where $D_{KL}(\cdot\|\cdot)$ denotes the Kullback-Leibler divergence, with the aim to make $q_0$ as close to p as possible. This corresponds to maximizing the Evidence Lower Bound (also referred to as ELBO), $$\mathcal{L}(\theta) = \mathbb{E}_{q_\theta(z|x)}[\log p(z,x) - \log q_\theta(z|x)].$$

Approximating the gradients for optimization from batches of samples, allowing online parameter updates to be made while holding only a fraction of data in memory, this process is referred to as stochastic variational inference.

A variational autoencoder learns a probabilistic autoencoding estimator as two conditional distributions described by neural networks. The encoding distribution $q_\theta(z|x)$ describes how to sample the latent low-dimensional representation from an observation x and the decoding distribution $p_\varphi(x|z)$ describes how to sample a reconstructed x from the latent representation. Optimization aims to maximize:

$$\mathcal{L}(\theta, \varphi) = \mathbb{E}_{q_\theta(z|x)}[\log p_\varphi(x, z)] - \mathbb{E}_{q_\theta(z|x)}[\log q_\theta(z \mid x)]$$

$$= \mathbb{E}_{q_\theta(z|x)}[\log p_\varphi(x, z)] - \mathbb{E}_{q_\theta(z|x)}[\log q_\theta(z \mid x)] +$$

$$\mathbb{E}_{q_\theta(z|x)}[\log p(z)]$$

$$= \mathbb{E}_{q_\theta(z|x)}[\log p_\varphi(x, z)] - D_{KL}(q_\theta(z \mid x)\|p(z))$$

For computational expediency, the expectations above can be approximated via single-sample Monte Carlo integration. In particular, for the ith $X_i$, $$Z_i \sim q_\theta(\cdot|X=x_i)$$

is sampled and the following unbiased approximations are formed:

$$\mathbb{E}_{q_\theta(z|x)}[\log p_\varphi(x,z)] \approx \log p_\varphi(X_i, Z_i)$$

$$\mathbb{E}_{q_\theta(z|x)}[\log q_\theta(z|x)] \approx \log q_\theta(Z_i|X_i)$$

The VAE estimator takes $X_i \in \mathbb{R}^b$ to be user i's ratings for each item (or the residual ratings after subtracting off half of user i's and item j's mean values), where b refers to the number of items included in the matrix M. The VAE estimator estimates:

$$q_\theta(z|x) = \eta_{10}(z; f_1(x), \exp(f_2(x)I_{10}))$$

where $\eta_{10}$ denotes a 10-dimensional Normal distribution, $I_{10}$ is the 10×10 identity matrix, and $f_1$, $f_2$ are leaky rectified linear unit activated neural networks with a single hidden layer. Here, θ corresponds to the parameters for the neural networks $f_1$, $f_2$.

The VAE estimator estimates:

$$p_\varphi(z_i|x) = \eta_{m_i}(z; g(x), I_{m_i})$$

where $m_i$ denotes the number of items user i rated, g is a leaky rectified linear unit activated neural network with a single hidden layer, and φ denotes the parameters for g. The VAE estimator is trained to maximize the Evidence Lower Bound (ELBO) discussed above, which provides a tractable lower bound to the log likelihood. To maximize the log likelihood the VAE estimator minimizes the negative evidence lower bound as a loss function.

Additional information regarding variational autoencoders can be found in "Variational autoencoders for collaborative filtering," by D. Liang, R. G. Krishnan, M. D. Hoffman, and T. Jebara, in *International World Wide Web Conference*, 2018, pp. 689-698, and "Item recommendation with variational autoencoders and heterogeneous priors," by G. Karamanolakis, K. R. Cherian, A. R. Narayan, J. Yuan, D. Tang, and T. Jebara, in *Workshop on Deep Learning for Recommender Systems*, 2018, both of which are hereby incorporated by reference herein in their entirety.

Figure 4:
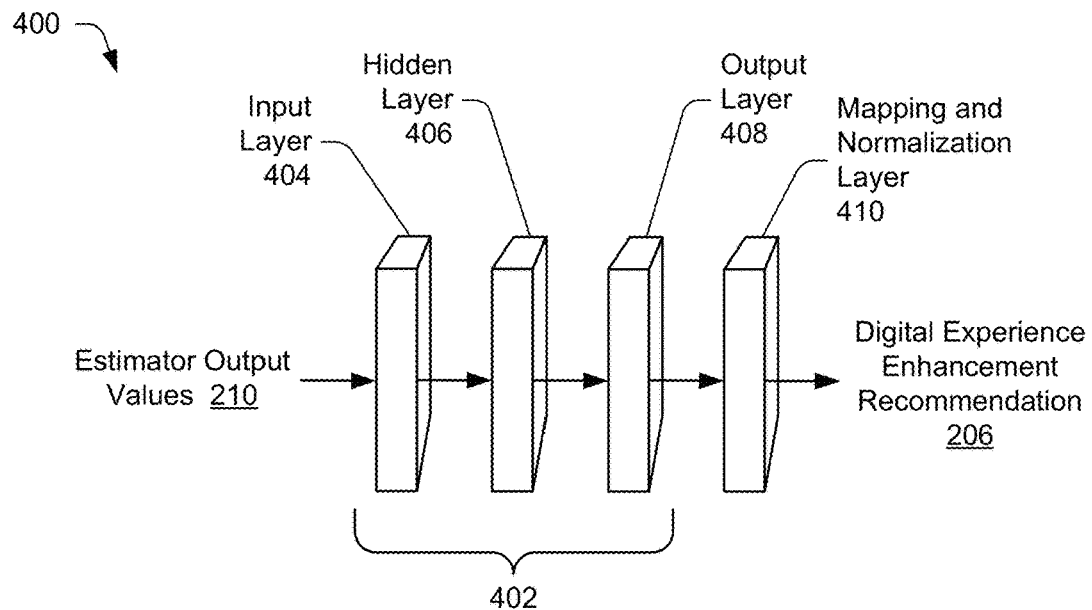
FIG. 4 illustrates an example of a neural network.

In one or more implementations, the neural network 204 is implemented as a 3-layer neural network. FIG. 4 illustrates an example 400 of a neural network 402. The neural network 402 can be, for example, the neural network 204 of FIG. 2 or FIG. 3. The neural network 402 includes an input layer 404, a hidden layer 406, and an output layer 408. The estimator output values 210 are fed into the input layer 404, the hidden layer 406 implements leaky rectified linear activation, and the output layer 408 outputs vectors of predicted logits L. The example 400 further includes a mapping and normalization layer 410, which maps the logits L to a mapped value using the function $$\frac{1}{1+e^{-L}}.$$

These mapped values are normalized to produce probabilities for one of multiple (e.g., 5) potential item values.

The digital experience enhancement recommendation 206 output by the mapping and normalization layer 410 is a set of probability distributions on the multiple potential rating values. For example, if there are 5 potential rating values for a movie, the digital experience enhancement recommendation 206 can be a vector [0.01 0.04 0.10 0.75 0.10] to indicate that there is a 1% chance of the rating being the first rating value, a 4% chance of the rating being the second rating value, a 10% chance of the rating being the third rating value, a 75% chance of the rating being the fourth rating value, and a 10% chance of the rating being the fifth rating value. This can be viewed as a recommendation of a rating value of the fourth rating value.

The neural network 402 in the example 400 is trained to minimize the cross-entropy loss between the ground truth and the digital experience enhancement recommendation 206 output by the mapping and normalization layer 410. The ground truth can be represented as, for example, a one-hot vector. During training, weights of the neural network 402 can be updated using various techniques. In one or more implementations, weights of the neural network 402 are updated using stochastic gradient descent with Nesterov momentum.

Figure 5:
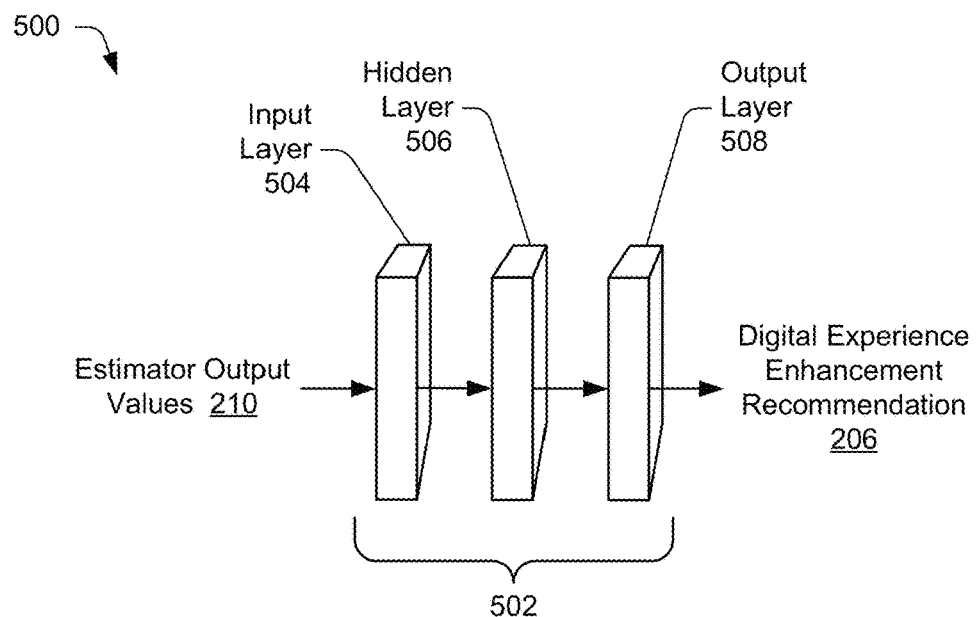
FIG. 5 illustrates another example of a neural network.

FIG. 5 illustrates another example 500 of a neural network 502. The neural network 502 can be, for example, the neural network 204 of FIG. 2 or FIG. 3. The neural network 502 includes an input layer 504, a hidden layer 506, and an output layer 508. The estimator output values 210 are fed into the input layer 504, the hidden layer 506 implements rectified linear activation, and the output layer 508 outputs single valued outputs. For a particular set of estimator output values 210 (e.g., generated from a sample of training data or an enhancement request 208), the neural network 502 generates a single value output as the digital experience enhancement recommendation 206. For example, if the potential rating values for a movie are "1", "2", "3", "4", or "5", then the single value output as the digital experience enhancement recommendation 206 can be "4".

The neural network 502 in the example 500 is trained to minimize the root mean square error between the ground truth and the digital experience enhancement recommendation 206 output by the output layer 508. The ground truth can be represented as, for example, a single value (the ground truth value). During training, weights of the neural network 204 can be updated using various techniques. In one or more implementations, weights of the neural network 204 are updated using the Adam optimization algorithm.

Thus, as can be seen from the discussion herein, there are numerous different classes of estimators that can be used in the estimator ensemble 202, different types of estimators within a class of estimators, different configuration settings for the different estimators, and different loss functions for the different estimators. In light of all these different options, rather than being a small or easily traversed number of different combinations of estimators, configuration settings, and loss functions that can be used in the estimator ensemble 202, there are a large number of different combinations of estimators, configuration settings, and loss functions that can be used in the estimator ensemble 202. At least one technique the inventors have discovered is that including at least one estimator from each of the singular value decomposition (SVD) estimators 212, the neighborhood and clustering estimators 214, the factorization estimators 216, the gradient boosting estimators 218, the time-aware estimators 220, and the variational autoencoder (VAE) estimators 222, combined with training the neural network 204 to minimize root mean square error or cross-entropy loss as discussed above, provides a recommendation performance that exceeds the performance provided by conventional techniques.

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-5.

Figure 6:
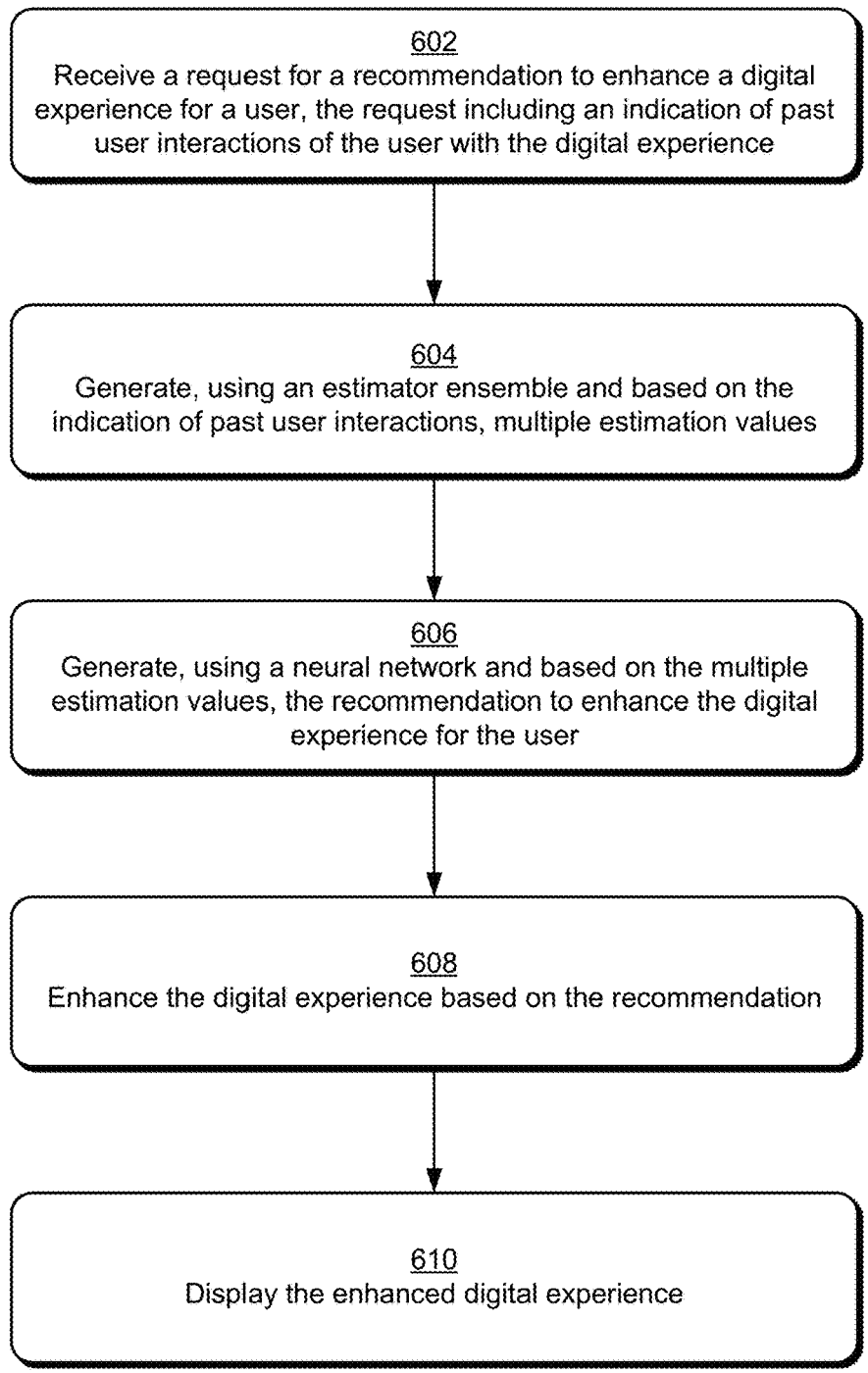
FIG. 6 is a flow diagram depicting a procedure in an example implementation of digital experience enhancement using an ensemble deep learning model.

FIG. 6 is a flow diagram depicting a procedure in an example implementation of digital experience enhancement using an ensemble deep learning model. In this example, a request for a recommendation to enhance the digital experience for a user is received (block 602). The request includes an indication of past user interactions of the user with the digital experience. These past user interactions can take various forms, such as ratings provided by the user for content.

Multiple estimation values are generated using an estimator ensemble and based on the indication of past user interactions (block 604). At least one of the multiple estimation values is generated by each of multiple estimators included in an estimator ensemble. The estimator ensemble includes a singular value decomposition estimator, a neighborhood or clustering estimator, a factorization estimator, a time-aware estimator, a variational autoencoder estimator, and a gradient boosting estimator.

The recommendation to enhance the digital experience for the user is generated using a neural network and based on the multiple estimation values (block 606). The recommendation can be, for example, a set of probability distributions on multiple potential values or a single value output.

The digital experience is enhanced based on the recommendation (block 608), and the enhanced digital experience is displayed (block 610). The enhancement of the digital experience can take various forms as discussed above, such as providing a value for an item (e.g., a rating for a movie), a font or color to use for a Web page, and so forth.

Figure 7:
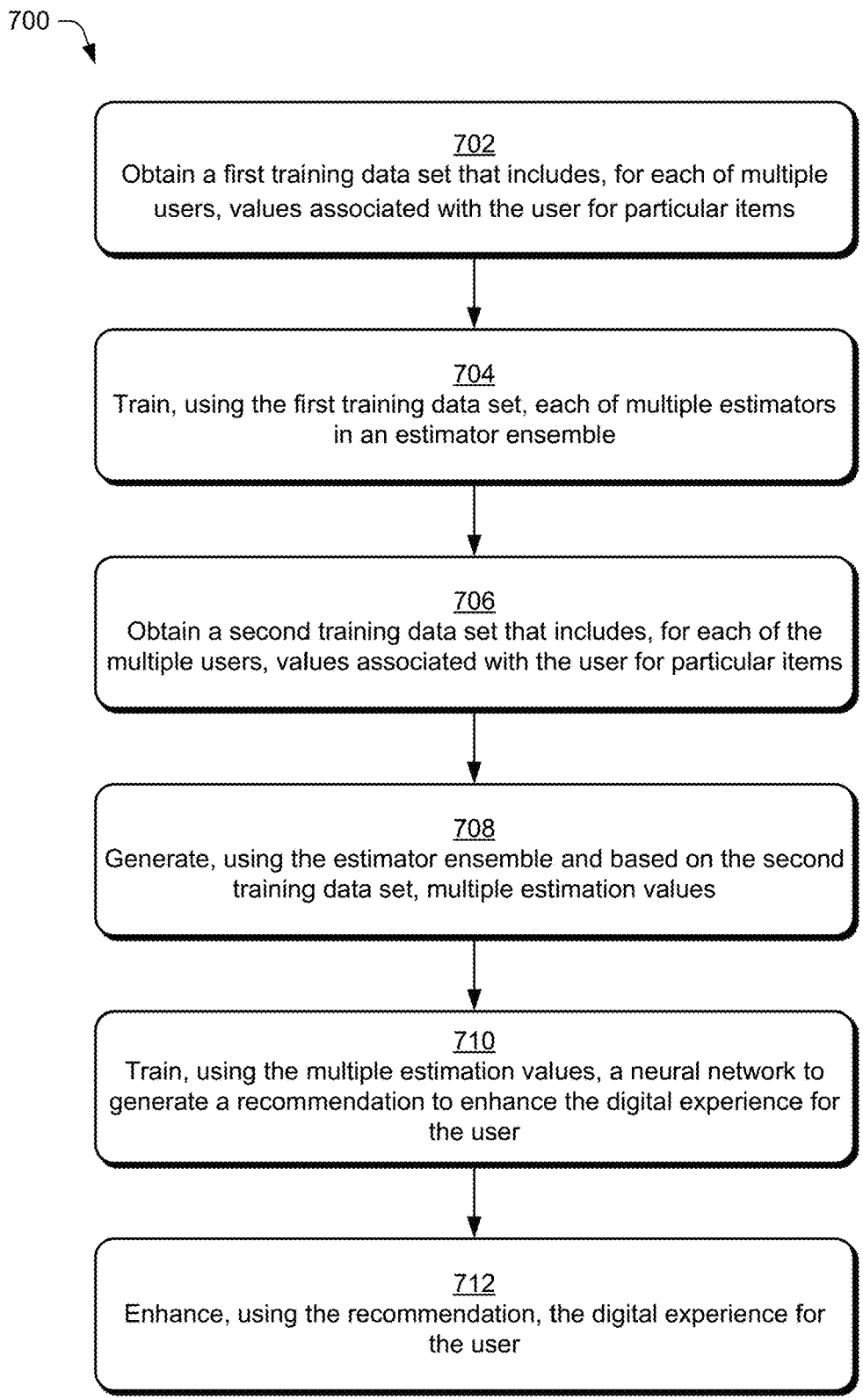
FIG. 7 is a flow diagram depicting a procedure in an example implementation of digital experience enhancement using an ensemble deep learning model.

FIG. 7 is a flow diagram depicting a procedure in an example implementation of digital experience enhancement using an ensemble deep learning model. In this example, a first training data set is obtained (block 702). The first training data set includes, for each of multiple users, values associated with the user for particular items.

Each of multiple estimators in an estimator ensemble are trained using the first training data set (block 704). The multiple estimators include a singular value decomposition estimator, a neighborhood or clustering estimator, a factorization estimator, a time-aware estimator, a variational autoencoder estimator, and a gradient boosting estimator.

A second training data set is also obtained (block 706). The second training data set includes, for each of the multiple users, values associated with the user for particular items.

Multiple estimation values are generated using the estimator ensemble and based on the second training data set (block 708). An estimation value is generated by each of the estimators in the estimator ensemble.

A neural network is trained using the multiple estimation values generated by the estimator ensemble (block 710). The neural network is trained to generate a recommendation to enhance the digital experience for the user.

The digital experience for the user is enhanced using the recommendation from the neural network (block 712). The enhancement of the digital experience can take various forms as discussed above, such as providing a value for an item (e.g., a rating for a movie), a font or color to use for a Web page, and so forth.

Example System and Device

Figure 8:
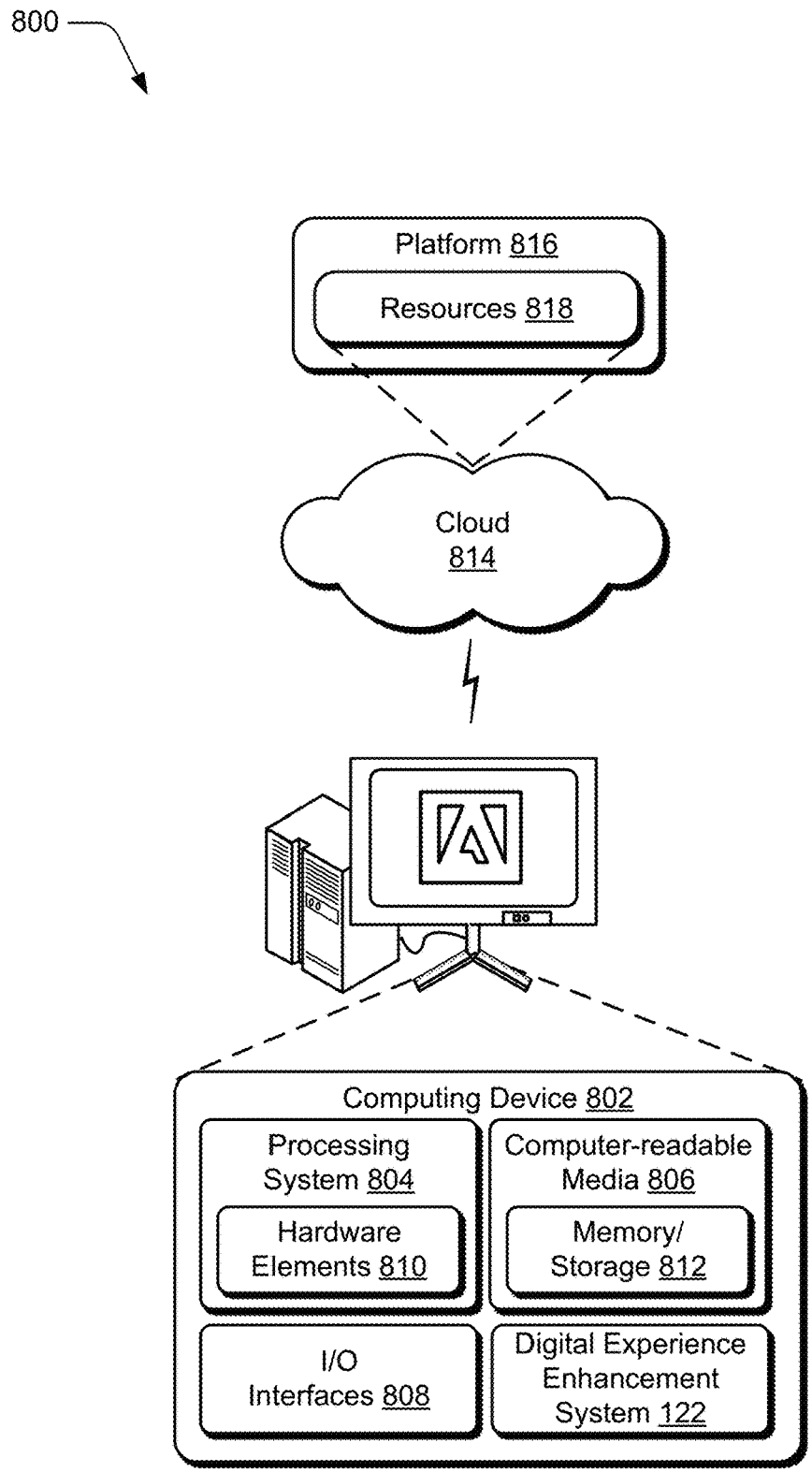
FIG. 8 illustrates an example system including various components of an example device that can be implemented as any type of computing device as described and/or utilized with reference to FIGS. 1-7 to implement aspects of the techniques described herein.

FIG. 8 illustrates an example system generally at 800 that includes an example computing device 802 that is representative of one or more computing systems and/or devices that may implement the various techniques described herein. This is illustrated through inclusion of the digital experience enhancement system 122. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
  generating, by a processing device, a trained estimator ensemble to generate multiple estimation values by training, using a first training data set including ground truths that are specific to a digital experience use scenario based on past user interactions with a digital experience displayed in a user interface, an estimator combination of a singular value decomposition estimator, a neighborhood or clustering estimator, a factorization estimator, a time-aware estimator that includes a time-aware neural factorization estimator leveraging a time that a value is provided by the user, a variational autoencoder estimator, and a gradient boosting estimator included in an estimator ensemble to generate an estimation value;
  training, by the processing device using a second training data set and the multiple estimation values generated by the trained estimator ensemble, a neural network to generate recommendations to enhance the digital experience for the user, the neural network including nodes with weights that are tuned to minimize root mean square errors between the ground truths and the recommendations to enhance the digital experience for the user;
  updating, by the processing device, the weights using stochastic gradient descent with Nesterov momentum and applying an Adam optimizer;
  receiving, by the processing device, a request for a recommendation to enhance the digital experience for the user, the request including an indication of past user interactions of the user with the digital experience;
  generating, by the processing device using the trained estimator ensemble and based on the indication of past user interactions, the multiple estimation values;
  generating, by the processing device using the neural network and based on the multiple estimation values, the recommendation to enhance the digital experience for the user;
  enhancing, by the processing device, the digital experience based on the recommendation to generate an enhanced digital experience; and
  displaying, by the processing device, the enhanced digital experience.

2. The method of claim 1, the recommendation being one of multiple potential values, the neural network comprising a 3-layer neural network followed by a mapping and normalization layer, the mapping and normalization layer outputting the recommendation as a set of probability distributions on the multiple values.

3. The method of claim 2, the training the neural network including minimizing cross-entropy loss between the recommendations and one-hot representations of ground truths using a loss function and a regression tree.

4. The method of claim 1, the recommendation being one of multiple potential values, the neural network comprising a 3-layer neural network outputting the recommendation as a single value output.

5. The method of claim 1, the past user interactions including values provided by the user for different items included in the digital experience.

6. The method of claim 5, the past user interactions further including a time feature that indicates, for a particular item, a time that the particular item was first available to the user.

7. The method of claim 5, the past user interactions further including a time feature that indicates, for a particular item, a time that the user provided the value for the particular item.

8. The method of claim 5, the past user interactions further including a time feature that indicates a time that the user first provided a value for any of the different items.

9. The method of claim 5, the past user interactions further including a time feature that indicates, for a particular item, a timespan between a time that the particular item was first available to the user and a time that the user provided the value for the particular item.

10. The method of claim 1, wherein the neighborhood or clustering estimator comprises an item k-nearest neighbors estimator that generates an estimator output value if a threshold confidence level is achieved.

11. The method of claim 10, wherein the neighborhood or clustering estimator further comprises a neighboring average estimator that averages the estimator output value from the item k-nearest neighbors estimator with an output generated by a k-means estimator.

12. A method comprising:
obtaining, by a processing device, a first training data set that includes, for each of multiple users, values associated with the user for particular items including ground truths that are specific to a digital experience use scenario based on past user interactions with a digital experience displayed in a user interface;
training, by the processing device in a first stage using the first training data set, an estimator ensemble including an estimator combination of a singular value decomposition estimator, a neighborhood or clustering estimator, a factorization estimator, a time-aware estimator that includes a time-aware neural factorization estimator leveraging a time that a value is provided by the user, a variational autoencoder estimator, and a gradient boosting estimator in an estimator ensemble to generate an estimation value;
obtaining, by the processing device, a second training data set that includes, for each of the multiple users, values associated with the user for particular items;
generating, by the processing device using the estimator ensemble previously trained in the first stage and the second training data set, multiple estimation values;
training, by the processing device in a second stage using the multiple estimation values, a neural network to generate a recommendation to enhance the digital experience for the user, the neural network including nodes with weights that are tuned to minimize root mean square errors between the ground truths and the recommendation to enhance the digital experience for the user, the weights are updated using stochastic gradient descent with Nesterov momentum and applying an Adam optimizer; and
enhancing, by the processing device using the recommendation, the digital experience for the user.

13. The method of claim 12, the recommendation being one of multiple potential values, the neural network comprising a 3-layer neural network followed by a mapping and normalization layer, the mapping and normalization layer outputting the recommendation as a set of probability distributions on the multiple values, and the training the neural network comprising training the neural network to minimize cross-entropy loss between the recommendation and a one-hot representation of a ground truth using a loss function and a regression tree.

14. The method of claim 12, the recommendation being one of multiple potential values, the neural network comprising a 3-layer neural network outputting the recommendation as a single value output.

15. The method of claim 12, the particular items including movies.

16. The method of claim 12, wherein the first training data set and the second training data set are two different training data sets.

17. A system comprising:
means for generating a trained estimator ensemble by training, using a first training data set including ground truths that are specific to a digital experience use scenario based on past user interactions with a digital experience displayed in a user interface, an estimator ensemble including an estimator combination of a singular value decomposition estimator, a neighborhood or clustering estimator, a factorization estimator, a time-aware estimator that includes a time-aware neural factorization estimator leveraging a time that a value is provided by the user, a variational autoencoder estimator, and a gradient boosting estimator included in an estimator ensemble to generate an estimation value;
means for training, using a second training data set and multiple estimation values generated by the trained estimator ensemble, a neural network to generate recommendations to enhance a digital experience for a user, the neural network including nodes with weights that are tuned to minimize root mean square errors between the ground truths and the recommendations to enhance the digital experience for the user, the weights are updated using stochastic gradient descent with Nesterov momentum and applying an Adam optimizer; and
a display device to display, based on a recommendation to enhance the digital experience for the user generated by the neural network, an enhanced digital experience.

18. The system of claim 17, the recommendation being one of multiple potential values, the neural network comprising a 3-layer neural network followed by a mapping and normalization layer, the mapping and normalization layer outputting the recommendation as a set of probability distributions on the multiple values.

19. The system of claim 18, the means for training the neural network including minimizing cross-entropy loss between the recommendations and one-hot representations of ground truths using a loss function and a regression tree.

20. The system of claim 17, the recommendation being one of multiple potential values, the neural network comprising a 3-layer neural network outputting the recommendation as a single value output.

* * * * *